(12) United States Patent
Matsumoto et al.

(10) Patent No.: US 8,138,292 B2
(45) Date of Patent: Mar. 20, 2012

(54) METHOD FOR PRODUCING PARTICULATE WATER—ABSORBING AGENT COMPOSED PRINCIPALLY OF WATER ABSORBING RESIN

(75) Inventors: Koji Matsumoto, Himeji (JP); Sumio Okuda, Himeji (JP); Kunihiko Ishizaki, Himeji (JP)

(73) Assignee: Nippon Shokubai Co., Ltd. (JP)

( * ) Notice: Subject to any disclaimer, the term of this patent is extended or adjusted under 35 U.S.C. 154(b) by 0 days.

(21) Appl. No.: 12/922,011

(22) PCT Filed: Mar. 13, 2009

(86) PCT No.: PCT/JP2009/054913
§ 371 (c)(1),
(2), (4) Date: Sep. 10, 2010

(87) PCT Pub. No.: WO2009/113678
PCT Pub. Date: Sep. 17, 2009

(65) Prior Publication Data
US 2011/0009590 A1    Jan. 13, 2011

(30) Foreign Application Priority Data

| Mar. 13, 2008 | (JP) | 2008-064408 |
| Mar. 28, 2008 | (JP) | 2008-088072 |
| Apr. 25, 2008 | (JP) | 2008-115446 |
| Apr. 25, 2008 | (JP) | 2008-115751 |
| Jul. 18, 2008 | (JP) | 2008-187904 |
| Sep. 18, 2008 | (JP) | 2008-238918 |

(51) Int. Cl.
*C08F 20/06* (2006.01)

(52) U.S. Cl. .............. 526/317.1; 526/318.2; 526/223

(58) Field of Classification Search .......... 526/317.1, 526/318.2, 223
See application file for complete search history.

(56) References Cited

U.S. PATENT DOCUMENTS

| 2,572,321 | A | * | 10/1951 | Deanesly .............. 159/47.1 |
| 4,950,692 | A | | 8/1990 | Lewis et al. |
| 4,970,267 | A | | 11/1990 | Bailey et al. |
| 5,342,899 | A | | 8/1994 | Graham et al. |
| 6,458,921 | B1 | | 10/2002 | Dairoku et al. |
| 6,716,894 | B2 | | 4/2004 | Kajikawa et al. |
| 7,378,453 | B2 | | 5/2008 | Nogi et al. |
| 2008/0202987 | A1 | * | 8/2008 | Weismantel et al. ........ 209/32 |

FOREIGN PATENT DOCUMENTS

| JP | 7-232062 | 9/1995 |
| JP | 9-194598 | 7/1997 |
| JP | 2005-81204 | 3/2005 |
| WO | WO 2006-074816 | 7/2006 |
| WO | WO 2006/074816 A1 * | 7/2006 |

* cited by examiner

*Primary Examiner* — Ling-Siu Choi

(74) *Attorney, Agent, or Firm* — Occhiuti Rohlicek & Tsao LLP

(57) ABSTRACT

Provided is a production method for the particulate water-absorbing agent, which can contribute to property enhancement, and further improvement of productivity or the like, as well. One example of the production method for the particulate water-absorbing agent relevant to the present invention includes the polymerization step for obtaining a polymer gel; the drying step for drying the polymer gel to obtain a dried substance; the pulverization step for pulverizing the dried substance or the polymer gel to obtain the particulate water-absorbing resin; the classification step for sieving the particulate water-absorbing resin; the granule sizing step for granule sizing the particulate water-absorbing agent obtained from the particulate water-absorbing resin; and the transporting step for transporting the products produced in each of the steps to other steps. Preferably, one or more steps selected from the pulverization step, the classification step, the granule sizing step and the transporting step after the pulverization step are set under reduced pressure state.

21 Claims, 3 Drawing Sheets

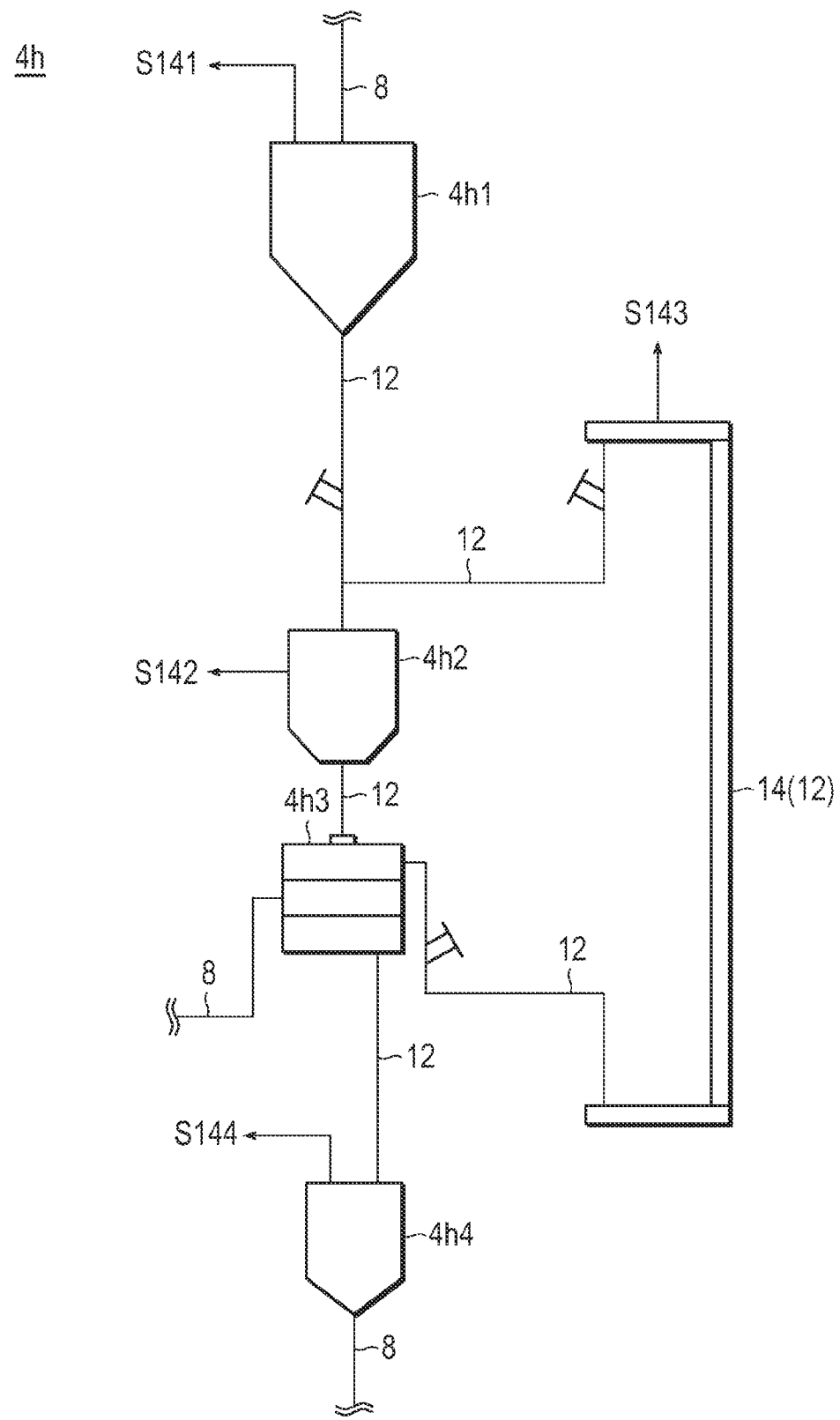

METHOD FOR PRODUCING PARTICULATE WATER—ABSORBING AGENT COMPOSED PRINCIPALLY OF WATER ABSORBING RESIN

CROSS REFERENCE TO RELATED APPLICATIONS

This application is a National Stage of International Application No. PCT/JP2009/054913, filed on Mar. 13, 2009, which claims the priority of Japanese Application No. 2008-064408 filed Mar. 13, 2008, Japanese Application No. 2008-088072 filed Mar. 28, 2008, Japanese Application No. 2008-115446 filed Apr. 25, 2008, Japanese Application No. 2008-115751 filed Apr. 25, 2008, Japanese Application No. 2008-187904 filed Jul. 18, 2008, and Japanese Application No. 2008-238918 filed Sep. 18, 2008. The content of the prior application mentioned above is incorporated herein by reference in its entirety.

BACKGROUND OF THE INVENTION

1. Technical Field

The present invention relates to a method for producing a particulate water-absorbing agent composed principally of a water-absorbing resin.

2. Background Art

In recent years, in hygiene products such as disposable diapers, sanitary napkins and incontinent pads, the water-absorbing resin as a composition material thereof has been widely used, as a water-absorbent agent, in view of absorbing a body liquid. As such a water-absorbing resin, for example, there have been known a cross-linked product of partially neutralized polyacrylic acid, a hydrolysate of a starch-acrylic acid graft polymer, a saponified product of a vinyl acetate-acrylate ester copolymer, a hydrolysate of an acrylonitrile copolymer or an acrylamide copolymer and a cross-linked product thereof, and a cross-linked product of a cationic monomer and the like. This water-absorbing resin may be used after converted to also a sheet-like, fiber-like or film-like form, and, it is generally used in a water-absorbing agent after converted to a powder-like form (particulate). As such powders (particles), for example, the particulate water-absorbing agent, having a weight average particle diameter thereof of about 200 to 800 μm, is used widely. The particulate water-absorbing agent is produced via many steps. These steps may include the polymerization step, the drying step, the pulverization step, the classification step, the surface cross-linking step, and the like.

In producing the particulate water-absorbing agent, enhancement of various properties are considered. A production step has been studied with an object of enhancing various properties. For example, US-A-2003/087983 (Patent Document 1) discloses a production method for removing metallic foreign substances by a magnetic ray irradiation step. This production method can suppress deterioration of a water-absorbing resin effectively.

In a production process of the particulate water-absorbing agent, moisture evaporates from a polymer gel or the like. Humidity containing this steam can spread to the whole area of a production facility via a production apparatus or a pipeline of each step. This humidity can generate dew condensation in the inside of the production apparatus or the pipeline. When the particulate water-absorbing resin absorbs humidity or moisture, the particulate water-absorbing resins themselves may aggregate or the particulate water-absorbing resin tends to attach to the inner surface of the production apparatus or the pipeline, which disturbs stable production. In addition to this, moisture absorption by the particulate water-absorbing resin in the production step may decrease quality of the particulate water-absorbing agent obtained finally.

In addition, in producing the particulate water-absorbing agent, formation of the fine powders (for example, the fine powders with a particle diameter of below 150 μm) of the water-absorbing resin is accompanied. If the fine powders are contained in disposable diapers and the like, they clog absorbent articles composed of the particulate water-absorbing agent, which causes decrease in liquid permeability of the absorbent articles. In addition, the fine powders influence surface cross-linking effect of the particulate water-absorbing agent, and even if surface cross-linking is performed to the particulate water-absorbing agent containing the fine powders, there can be the case where various properties such as liquid permeability, absorbency against pressure are not enhanced sufficiently.

Amount of the fine powders generating in producing the particulate water-absorbing agent can become several % by weight to ten and several % by weight, and in certain cases, as many as several tens % by weight of solid content of the polymer gel obtained in the polymerization step, that is, a dry substance or a dried pulverized substance. Because disposal of the fine powders accompanies generation of disposal cost of the fine powders in addition to decrease in yield of the particulate water-absorbing agent, it incurs increase in production cost of the particulate water-absorbing agent. Because the fine powders are inferior in properties, it is difficult to utilize the fine powders to other applications without disposal. Because demand for the fine powders is generally low, it is also difficult to sell the fine powders.

Accordingly, as a method for obtaining a cheap particulate water-absorbing agent containing less fine powders, many methods for reusing the fine powders, that is, recycling methods for the fine powders have been proposed. As the recycling methods for the fine powders, there are (I) a method for mixing the fine powders as they are into an aqueous solution containing a monomer before polymerization to polymerize (refer to Patent Document 2), (II) a method for mixing the fine powders as they are into a gel in the way of polymerization to polymerize (refer to Patent Documents 3 and 4), (III) a method for mixing the fine powders as they are into a polymer gel obtained by polymerization, (IV) a method for mixing a large particle obtained by granulating the fine powders in aqueous liquid into a polymer gel obtained by polymerization (refer to Patent Document 5) and the like. Among these, in the methods (I) to (III), the fine powders are used as they are. In these methods, uniform mixing of the fine powders is difficult, and further the fine powders absorb a monomer, water or the like and thus could decrease performance thereof. From this view point, a method (IV) is considered preferable, which utilizes granulated particles composed of a plurality of the fine powders. In the method (IV), the granulated particles (secondary particles) as large particles are formed by binding the fine powders (single particles) themselves generally by use of water as a binder. Because the aqueous liquid as water is contained in the granulated particles, it is necessary to dry the granulated particles. In addition, as an application of the method (IV), it is also considered a method for making particles by pulverizing the granulated gels (tertiaryparticles) obtained by further aggregating the granulated particles themselves composed of a plurality of the fine powders. However, this method results in containing a large quantity of water by the granulated gel, and therefore consumes a large quantity of energy for drying the granulated gel. Such a method cannot be said to be a preferable method due to increase in production cost.

The production method for the particulate water-absorbing agent usually includes the step (surface cross-linking step) for cross-linking the neighborhood of the surface of the water-absorbing resin by adding a surface cross-linking agent to the water-absorbing resin and heating. This step is apt to be accompanied with the step for cooling the particulate water-absorbing agent thus heated. In this cooling step, there may be the case where a method for removing the fine powders of the water-absorbing resin and/or a part of the remaining surface cross-linking agent, while cooling the particulate water-absorbing agent thus heated by the air generated by reduced pressure (refer to Patent Document 6). In this method, surface cross-linking is performed in a state that the fine powders generated in the step before this step are contained as they are. Therefore, the remaining fine powders cannot be removed, and thus there is a problem that the remaining fine powders deteriorate work environment. Because the fine powders deteriorate mixing property of the water-absorbing resin with the surface cross-linking agent, there is also a problem that the neighborhood of the surface of the water-absorbing resin is not cross-linked sufficiently. Further, action of a part of the surface cross-linking agent makes granulation of the remaining fine powders, and the fine powders granulated are crushed in the subsequent steps or in producing an water-absorbing material (for example, in producing absorbent articles such as disposable diapers and the like), and the fine powders thus crushed fly as dust, and thus there are also worry about causing a problem of deterioration of work environment, and a problem that the fine powders thus crushed obstruct performance (for example, liquid permeability) of the absorbent articles.

In addition, with enhancement of performance of the particulate water-absorbing agent, enhancement of properties of the water-absorbing resin, such as absorbency against non-pressure (CRC), absorbency against pressure (AAP) and saline flow conductivity (SFC) to be described later, has been required. In order to respond to this request, a firm surface cross-link structure is introduced to the surface of the water-absorbing resin, or many additives (for example, water-insoluble fine particle and the like) are used. However, such steps take a long time process in many cases. Therefore, the water-absorbing resin particles are destroyed to incur by-production of the fine powders. That is, requiring of high property to the water-absorbing resin results in increasing the fine powders in the water-absorbing agent obtained.

PRIOR DOCUMENTS

Patent Documents

Patent Document 1: US-A-2003/087983
Patent Document 2: U.S. Pat. No. 5,342,899
Patent Document 3: U.S. Pat. No. 4,970,267
Patent Document 4: U.S. Pat. No. 4,950,692
Patent Document 5: U.S. Pat. No. 6,458,921
Patent Document 6: US-A-2004/0181031

DISCLOSURE OF THE INVENTION

Problem to be Solved by the Invention

The methods described in the above publications have attained recycling of the fine powders, and however, it is a present state that removal of the fine powders contained in the particulate water-absorbing agent is not yet sufficient. Because of insufficient removal of the fine powders, there is a problem that various properties, such as liquid permeability, absorbency against pressure, or the like of the particulate water-absorbing agent cannot be enhanced sufficiently.

In addition, in the particulate water-absorbing agent, ensuring of stable production is required. In particular, in the production facility having an industrial scale, it is important that the facility is operated stably.

Accordingly, it is an object of the present invention to provide a method for producing the particulate water-absorbing agent, which can contribute to property enhancement, and further improvement of productivity and the like.

Means for Solving the Problem

In the present invention, in the method for producing the particulate water-absorbing agent composed principally of the water-absorbing resin, reduced pressure state is used. Conventionally, it has been known in the field of the water-absorbing resin to perform reduced pressure polymerization or reduced pressure drying to prevent thermal deterioration. On the other hand, in the present invention, effectiveness of reduced pressure was found from a viewpoint completely different from the conventional reduced pressure polymerization or reduced pressure drying. That is, the present inventors found that a novel production method for performing reduced pressure in the step after the drying step, that is, in the step including and subsequent to the pulverization step, can contribute to enhancement of property such as liquid permeation or the like. In addition, it was clarified that various factors participate in property enhancement by this reduced pressure.

Further, the present inventors found that the present production method using reduced pressure can contribute to stable production. Further, it was clarified that this production method can also contribute to improvement of work environment.

That is, a method for producing the particulate water-absorbing agent relevant to the present invention includes a polymerization step for obtaining a polymer gel, a drying step for drying the polymer gel to obtain a dried substance, a pulverization step for pulverizing the dried substance or the polymer gel to obtain a particulate water-absorbing resin, a classification step for sieving the particulate water-absorbing resin; a transporting step for transporting the products produced in each of the steps to the other steps. In this production method, one or more steps selected from the pulverization step, the classification step and the transporting step after the pulverization step, are set under reduced pressure state.

Another method for producing the particulate water-absorbing agent relevant to the present invention includes a polymerization step for obtaining a polymer gel, a drying step for drying the polymer gel to obtain a dried substance, a pulverization step for pulverizing the dried substance or the polymer gel to obtain a particulate water-absorbing resin; a classification step for sieving the particulate water-absorbing resin, a granule sizing step for granule sizing the particulate water-absorbing agent obtained from the particulate water-absorbing resin obtained in the classification step, a transporting step for transporting the products produced in each of the steps to the other steps. In this production method, one or more steps selected from the pulverization step, the classification step, the granule sizing step, and the transporting step after the pulverization step, are set under reduced pressure state.

Another method for producing the particulate water-absorbing agent relevant to the present invention includes a polymerization step for obtaining a polymer gel, a drying step for drying the polymer gel to obtain a dried substance, a pulverization step for pulverizing the dried substance or the polymer gel to obtain a particulate water-absorbing resin, a classification step for sieving the particulate water-absorbing resin, a surface cross-linking step for cross-linking the neighborhood of the surface of the particulate water-absorbing resin obtained in the classification step to obtain a particulate water-absorbing agent, a packaging step for filling a packaging material container with the particulate water-absorbing agent for packaging, and a transporting step for transporting the products produced in each of the steps to the other steps. In this production method, one or more steps selected from the pulverization step, the classification step, the surface cross-linking step, the packaging step, and the transporting step after the pulverization step, are set under reduced pressure state.

Another method for producing the particulate water-absorbing agent relevant to the present invention includes, a polymerization step for obtaining a polymer gel, a drying step for drying the polymer gel to obtain a dried substance, a pulverization step for pulverizing the dried substance or the polymer gel to obtain a particulate water-absorbing resin, a classification step for sieving the particulate water-absorbing resin, a surface cross-linking step for cross-linking the neighborhood of the surface of the particulate water-absorbing resin obtained in the classification step to obtain a particulate water-absorbing agent, a granule sizing step for granule sizing the particulate water-absorbing agent, a packaging step for filling a packaging material container with the particulate water-absorbing agent for packaging, and a transporting step for transporting the products produced in each of the steps to the other steps. In this production method, one or more steps selected from the pulverization step, the classification step, the surface cross-linking step, the granule sizing step, the packaging step, and the transporting step after the pulverization step, are set under reduced pressure state.

Preferably, the pulverization step is set under reduced pressure state. Preferably, the transporting step performed next to the pulverization step is set under reduced pressure state.

Preferably, all steps including and subsequent to the pulverization step are set under reduced pressure state. The production method of the present invention essentially includes the polymerization step, the drying step, the pulverization step, the classification step and the transporting step, and in addition to these, as needed, includes the surface cross-linking step, the cooling step, the granule sizing step, the packaging step, the collection step and the granulation step. In the present invention, all steps including and subsequent to the pulverization step mean all steps from the pulverization step to the step performed finally in the present production method (the final step). Specifically, among the classification step, the surface cross-linking step, the cooling step, the granule sizing step, the packaging step and the transporting step, the step to be performed finally is the final step. For example, in the case of the production method including the packaging step, all steps including and subsequent to the pulverization step mean the step from the pulverization step to the packaging step.

Preferably, the production method of the present invention includes the granulation step.

Preferably, equal to or more than 50% of total time required including and subsequent to the pulverization step is set under reduced pressure state. For example, equal to or more than 50% of time required from the pulverization step to the packaging step is set under reduced pressure state. That is, preferably, in treatment time required from the pulverization step to the packaging step, time to be under reduced pressure state is set equal to or more than 50%. The final step in the production steps of the present invention is, for example, the packaging step. As the final step in the case of production method not having the packaging step, for example, the transporting step and the granule sizing step and the like are included.

Preferably, the transporting step includes the transporting step by pressurization. Preferably, all steps including and subsequent to the pulverization step are set under reduced pressure state or pressurized state. It should be noted that, it is preferable that the step set under pressurized state is the transporting step. It is preferable that the steps other than the transporting step are not set under pressurized state.

Preferably, degree of reduced pressure relative to atmospheric pressure, of inside of the step under the reduced pressure state is set at over 0 kPa and equal to or lower than 10 kPa.

Preferably, in the present production method, the particulate water-absorbing resin is an irregular pulverized shaped particle of a polyacrylic acid (salt)-based water-absorbing resin.

Preferably, in the present production method, the polymerization step is performed by continuous kneader polymerization or continuous belt polymerization.

Preferably, in the present production method, the surface cross-linking step is performed using a surface cross-linking agent having dehydration esterification reactivity of one or more kinds selected from a group consisting of an oxazolidinone compound, an alkylene carbonate compound, a polyvalent alcohol compound, and an oxetane compound, at a temperature in the range of 150 to 250° C.

Preferably, in the present production method, absorbency against non-pressure (CRC) of the particulate water-absorbing agent is equal to or higher than 15 g/g, and saline flow conductivity (SFC) thereof is equal to or higher than 30 $(\times 10^{-7} \cdot cm^3 \cdot s \cdot g^{-1})$ Preferably, in the present production method, content of fine powders of below 150 μm of the water-absorbing agent is below 1% by weight.

Advantages of the Invention

In the present invention, by setting inside of the step including and subsequent to the pulverization step to reduced pressure state, property of the particulate water-absorbing agent is enhanced. In addition, by exhaust accompanied with the reduced pressure, dehumidification is performed. By this dehumidification, moisture absorption of the particulate water-absorbing resin in the step is suppressed. Accordingly, aggregation of the particulate water-absorbing resins themselves or attachment of the particulate water-absorbing resin to the apparatus or the like is suppressed, which can stabilize production. Further, in the present invention, the fine powders can be removed effectively. As a result, the particulate water-absorbing agent obtained by the production method of the present invention is superior in various properties such as liquid permeation or absorbency against pressure. In addition, by the present invention, leakage of the fine powders generating in the production steps to the exterior part can be suppressed.

BRIEF DESCRIPTION OF THE DRAWINGS

FIG. 3 is a drawing showing a schematic configuration of a granule sizing apparatus contained in the production facility of FIG. 1.

BEST MODE FOR CARRYING OUT THE INVENTION

Figure 1:
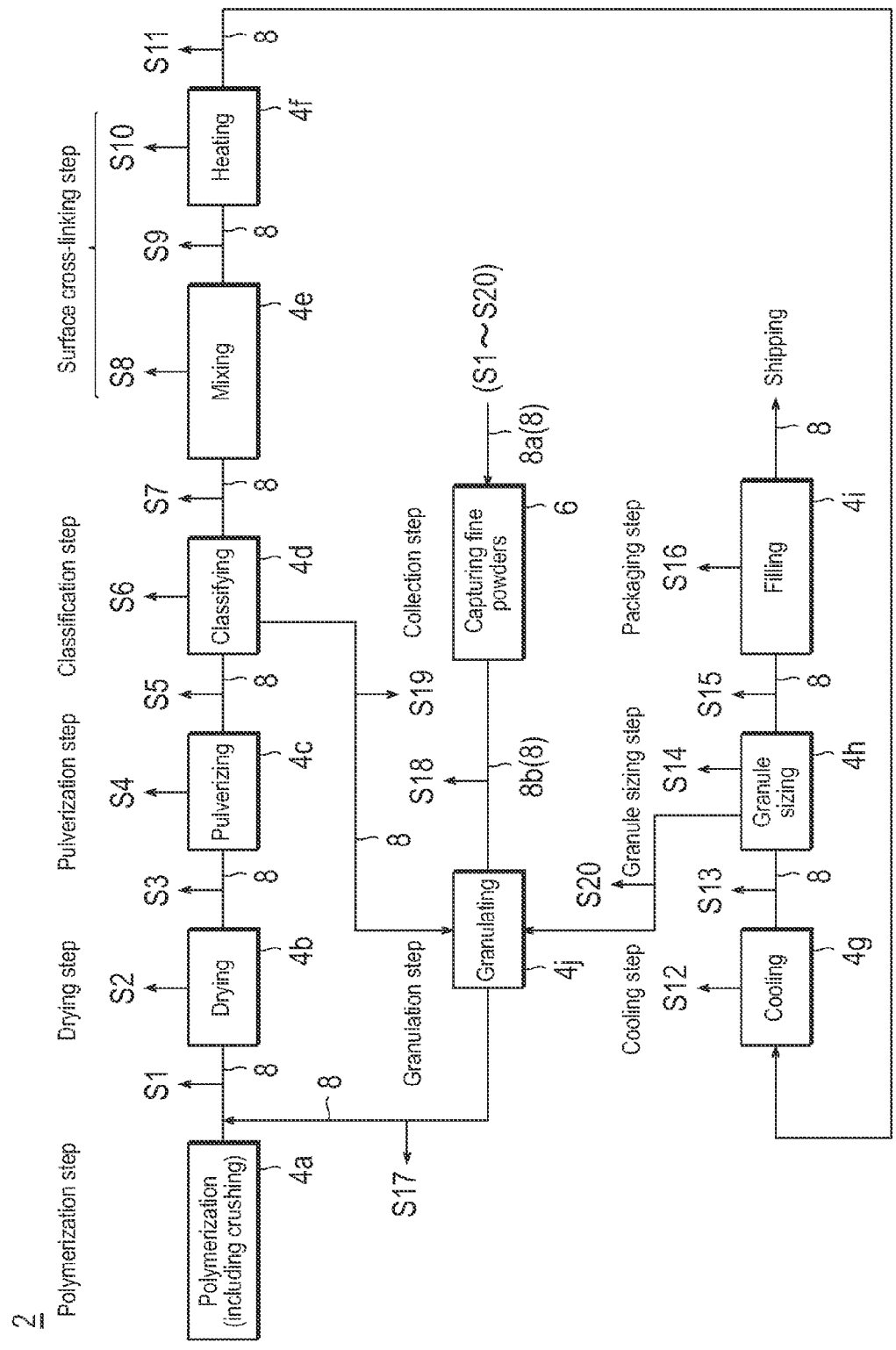
FIG. 1 is a schematic configuration drawing showing production facility to be used to produce the particulate water-absorbing agent by the production method of the present invention.

In the present invention, novel knowledge was obtained that reduced pressure can enhance property of the particulate water-absorbing agent. In particular, it was clarified that the effect is significant, in the case where equal to or more than 50% of time required in the step including and subsequent to the pulverization step, is set under reduced pressure state. Explanation will be given below in detail on a method for producing the particulate water-absorbing agent composed principally of the water-absorbing resin relevant to the present invention, and however, scope of the present invention should not be limited to these explanations.

(1) Definition of Terms (a) "The Water-Absorbing Resin"

In the present description, "the water-absorbing resin" means a water swelling and water insoluble polymer gelling agent, and one having the following properties. That is, it means a polymer gelling agent having an absorbency (CRC/specified in Example) of essentially equal to or higher than 5 g/g, preferably 10 to 100 g/g, and further preferably 20 to 80 g/g, and in addition, extractables (specified in ERT450.2-02 (2002)) of essentially 0 to 50% by weight, preferably 0 to 30% by weight, further preferably 0 to 20% by weight, and particularly preferably 0 to 10% by weight. It should be noted that, the water-absorbing resin is not limited to a form where whole amount (100%) is a polymer, and may include additives and the like to be described later, in a range to maintain the performance.

(b) "Polyacrylic Acid (Salt)"

In the present description, "polyacrylic acid (salt)" means a polymer composed principally of acrylic acid (salt) as a repeating unit. Specifically, it means a polymer containing acrylic acid (salt) essentially in 50 to 100% by mole, preferably 70 to 100% by mole, further preferably 90 to 100% by mole, particularly preferably substantially 100% by mole, as a monomer excluding a cross-linking agent. The salt as the polymer contains essentially a water-soluble salt, and is preferably a monovalent salt, and further preferably an alkali metal salt or an ammonium salt. Among them, the alkali metal salt is particularly preferable, and further a sodium salt is preferable.

(c) "The Water-Absorbing Agent"

In the present description, "the water-absorbing agent" means a gelling agent of aqueous liquid, composed principally of the water-absorbing resin. It should be noted that, the aqueous liquid is not limited to water, and may be urine, blood, feces, waste liquid, moisture or steam, ice, a mixture of water and organic solvent and/or inorganic solvent, rain water, underground water or the like, and not especially limited as long as it contains water. Among them, as the aqueous liquid, more preferably urine, in particular human urine is included. Content of the water-absorbing resin (polyacrylic acid (salt)-based water-absorbing resin) relevant to the present invention is preferably 70 to 99.9% by weight, more preferably 80 to 99.7% by weight, and further preferably 90 to 99.5% by weight relative to total amount. As components other than the water-absorbing resin, in view of water absorbing speed or impact resistance of powders (particles), water is preferable and the additives to be described later are contained, as needed.

(d) "EDANA" and "ERT"

"EDANA" is an abbreviation of European Disposables and Nonwovens Association, and "ERT" is an abbreviation of the measurement method (ERT/EDANA Recommended Test Methods) for the water-absorbing resin of an European standard (nearly a world standard). In the present description, unless otherwise specified, the ERT original (known document: revised in 2002) is referred to in measuring properties of the water-absorbing resin.

(e) "The Particle"

In the present description, "the particle" means a solid having fluidity of a particle diameter of equal to or smaller than 5 mm, specified by sieve classification. Water content is not especially limited as long as it is a solid, but, usually it is below 30% by weight, and further preferably equal to or less than 20% by weight. In addition, the lower limit of the particle diameter is, for example, 1 nm. Further, it may be enough to have a certain fluidity as powders, and for example, it means a solid whose Flow Rate (ERT450.2-02) can be measured, or a solid which can be sieve classified by (ERT420.2-02). Shape of the solid is not especially limited, and includes pulverized irregular shaped particles, spherical-shape, nearly spherical-shape, or a granulated substance (aggregated substance) thereof. However, preferably irregular pulverized shaped particles are included.

It should be noted that, in the present description, "X to Y" showing a range indicates to be equal to or higher than X and equal to or lower than Y. In addition, "1 ton (1 t)" showing a weight indicates to be 1 Metric ton.

(2) The Method for Producing the Particulate Water-Absorbing Agent

FIG. 1 is a schematic configuration drawing showing one example of production facility 2 for the particulate water-absorbing agent composed principally of the water-absorbing resin relevant to one embodiment of the present invention. The production step relevant to the present embodiment includes the polymerization step, the drying step, the pulverization step, the classification step, the surface cross-linking step, the cooling step, the granule sizing step, and the filling step. Further, this production method includes the transporting step for transporting a product produced in each of the steps to the next step. All of these steps are not necessarily essential. The present invention includes at least the polymerization step, the drying step, the pulverization step, the classification step and the transporting step.

This production facility 2 is provided with a polymerization apparatus 4a where the polymerization step is performed, a drying apparatus 4b where the drying step is performed, a pulverization apparatus 4c where the pulverization step is performed, a classification apparatus 4d where the classification step is performed, a mixing apparatus 4e and a heating apparatus 4f where the surface cross-linking step is performed, a cooling apparatus 4g where the cooling step is performed, a granule sizing apparatus 4h where the granule sizing step is performed, and a filling apparatus 4i where the filling step is performed. Further, the facility 2 is provided with a fine-powder capturing apparatus 6 where the collection step for collecting the fine powders is performed. In this production facility 2, each of these apparatuses is connected by a pipeline 8. This production facility 2 can produce the particulate water-absorbing agent continuously. Further, in the production facility 2, a granulation apparatus 4j, where the granulation step for granulating the fine powders collected in the collection step is performed, is installed.

Explanation will be given below in detail on each step.

[The Polymerization Step]

The polymerization step is the step for polymerizing a monomer, which can become the water-absorbing resin by polymerization (hereafter may also be referred to as a monomer), to generate a polymer gel. A polymerization method used in the production method relevant to the present invention is not especially limited, and for example, bulk polymerization, precipitation polymerization, aqueous solution polymerization, reversed phase suspension polymerization or the like is included. In view of performance and easiness of polymerization control, aqueous solution polymerization or reversed phase suspension polymerization, where the monomer can be used as an aqueous solution, is preferable. The polymerization apparatus 4a for performing the polymerization step is not especially limited, and a conventionally known one may be used.

The monomer is not especially limited, and, for example, one shown below is included: for example, an anionic unsaturated monomer such as (meth)acrylic acid, maleic acid (anhydride), itaconic acid, cinnamic acid, vinyl sulfonic acid, allyltoluene sulfonic acid, vinyltoluene sulfonic acid, styrene sulfonic acid, 2-(meth) acrylamido-2-methylpropane sulfonic acid, 2-(meth)acryloylethane sulfonic acid, 2-(meth)acryloylpropane sulfonic acid, 2-hydrokyethyl (meth)acryloyl phosphate, or the like, and a salt thereof; a mercapto group-containing unsaturated monomer; a phenolic hydroxy group-containing unsaturated monomer; an amide group-containing unsaturated monomer such as (meth)acrylamide, N-ethyl(meth)acrylamide, N,N-dimethyl(meth)acrylamide; an amino group-containing unsaturated monomer such as N,N-dimethylaminoethyl(meth)acrylate, N,N-dimethylaminopropyl(meth)acrylate, N,N-dimethylaminopropyl(meth)acrylamide, or the like; or the like. These monomers may be used alone or two or more kinds may be used in combination as appropriate. In view of performance and cost of the resultant water-absorbing resin, the water-absorbing resin is preferably a polyacrylic acid (salt)-based water-absorbing resin, and as a monomer therefor, it is preferable to use acrylic acid and/or a salt thereof (for example, a salt of sodium, lithium, potassium, ammonium, amines or the like, and among these the sodium salt is preferable in view of cost), as a principal component. Use amount of acrylic acid and/or the salt thereof is preferably equal to or more than 70% by mole, more preferably equal to or more than 80% by mole, further preferably equal to or more than 90% by mole, and particularly preferably equal to or more than 95% by mole relative to total monomer components (excluding an internal cross-linking agent to be described later). (The upper limit is 100% by mole.) It should be noted that, when the monomer is an acid group-containing monomer, neutralization rate thereof is not especially limited, and the polymer gel may be neutralized after polymerization, as needed. In applications where there may be contact to a human body, such as hygiene goods, neutralization after polymerization is not necessary. This neutralization rate is preferably from 40% by mole to 90% by mole, and more preferably from 50% by mole to 80% by mole.

When the above-described monomer is used as an aqueous solution in the polymerization step, concentration of the monomer in the aqueous solution (hereafter may also be referred to as "a monomer solution") is not especially limited, and, it is preferably within a range of 10 to 70% by weight, and further preferably within a range of 20 to 60% by weight.

In addition, when the aqueous solution polymerization or reversed phase suspension polymerization is performed, a solvent other than water may be used in combination, as needed. It should be noted that, kind of the solvent to be used in combination is not especially limited. Further, a polymerization inhibitor or an iron component may be contained in these monomers. As content of the iron component, equal to or less than 5 ppm by weight is preferable, and equal to or less than 1 ppm by weight is more preferable. In addition, the polymerization inhibitor is not especially limited, and, for example, methoxy phenols may be used preferably. In this case, use amount of the polymerization inhibitor is equal to or less than 160 ppm by weight, which has been disclosed in U.S. Pat. No. 7,049,366.

In the polymerization step, for example, a radical polymerization initiator may be used. This radical polymerization initiator is not especially limited, and one or more kinds may be selected and used from those utilized in usual polymerization of the water-absorbing resin, depending on kind of the monomer to be polymerized, polymerization conditions and the like. For example, a thermal decomposition-type initiator (for example, a persulfate such as sodium persulfate, potassium persulfate, ammonium persulfate, or the like; a peroxide such as hydrogen peroxide, t-butylperoxide, t-butylhydroperoxide, methyl ethyl ketone peroxide, or the like; an azo compound such as an azonitrile compound, an azoamidine compound, a cyclic azoamidine compound, an azoamide compound, an alkylazo compound, 2,2'-azobis(2-amidinopropane)dihydrochloride, 2,2'-azobis[2-(2-imidazoline-2-yl)propane]dihydrochloride, or the like; or the like or a photodecomposition-type initiator (for example, a benzoin derivative, a benzyl derivative, an acetophenone derivative, a benzophenone derivative, an azo compound or the like); or the like may be included. Among these, in view of cost and reduction capability of residual monomer, the thermal decomposition type initiator is preferable, and a persulfate salt is particularly preferable. In addition, because combined use of a reducing agent can promote decomposition of the radical polymerization initiator, it is possible to make a redox-type initiator by combining both. The reducing agent is not especially limited, and, for example, sulfurous acid (salt) (for example, sodium sulfite, potassium sulfite, ammonium sulfite or the like), hydrogen sulfite (salt) (for example, sodium hydrogen sulfite, potassium hydrogen sulfite, ammonium hydrogen sulfite or the like) pyrosulfurous acid (salt), L-ascorbic acid (salt), a reductive metal (salt) such as ferrous salt or the like; dithionous acid (salt), trithionous acid (salt), tetrathionous acid (salt), thiosulfurous acid (salt), dimethylsulfoxide, phosphorous acid (salt), nitrous acid (salt), thiourea dioxide, amino acid, amines (ethanolamine or the like), or the like is included. More preferable one is combined use of the photodecomposition-type initiator and the thermal decomposition-type initiator. Use amount of the radical polymerization initiator to be used in the above-described polymerization step is not especially limited. However, usually 0.001 to 2% by weight is preferable, and 0.01 to 0.5% by weight is more preferable relative to use amount of the monomer. The use amount of the radical polymerization initiator of below 0.001% by weight relative to use amount of the monomer, increases the unreacted monomer, and increases amount of residual monomers in the resultant water-absorbing resin, and is thus not preferable. On the other hand, the use amount of over 2% by weight increases water-soluble components in the resultant water-absorbing resin, and is thus not preferable. It should be noted that, in this polymerization step, instead of the above-described radical polymerization initiator, the monomer may be polymerized by irradiation of activated energy rays such as radiation rays, electron beams, UV rays, or the like.

In the polymerization step, an internal cross-linking agent may be used, as needed. As the internal cross-linking agent, a conventionally known internal cross-linking agent, having two or more polymerizable unsaturated groups or two or more reactive groups, in one molecule, is included. Specifically, for example, N,N'-methylenebis(meth)acrylamide, (poly)ethylene glycol di(meth)acrylate, (poly)propylene glycol di(meth)acrylate, trimethylolpropane tri(meth)acrylate, glycerin tri(meth)acrylate, glycerin acrylate methacrylate, ethylene oxide modified trimethylolpropane tri(meth)acrylate, pentaerythritol hexa(meth)acrylate, triallyl cyanurate, triallyl isocyanurate, triallyl phosphate, triallyl amine, polyallyloxy alkane, (poly)ethylene glycol diglycidyl ether, glycerol diglycidyl ether, ethylene glycol, polyethylene glycol, propylene glycol, glycerin, 1,4-butanediol, pentaerythritol, ethylene diamine, ethylene carbonate, propylene carbonate, polyethylene imine, glycidyl(meth)acrylate or the like is include. Among these, in consideration of reactivity, one or two or more kinds may be used. In particular, as the internal cross-linking agent, a compound having two or more polymerizable unsaturated groups is preferable. Use amount of the internal cross-linking agent may be determined as appropriate by desired property of the water-absorbing resin. However, usually use amount of the internal cross-linking agent is preferably in a range of 0.001 to 5% by mole relative to the monomer. Too low use amount of the internal cross-linking agent tends to decrease strength of the polymer gel and increase soluble content, and on the contrary, too much use amount tends to deteriorate property such as absorbency. It should be noted that, the internal cross-linking agent may be added to a reaction system once as a whole, or may be added dividedly.

In the polymerization step, further as needed, various foaming agents such as a carbonate (hydrogen) salt, carbon dioxide, an azo compound, an inert organic solvent, or the like; a hydrophilic polymer such as starch-cellulose, a derivative of starch-cellulose, polyvinyl alcohol, polyacrylic acid (salt), a cross-linked substance of polyacrylic acid (salt), or the like; various surfactants; a chain transfer agent such as hypophosphorous acid (salt) or the like; or the like, may be added to the reaction system, as appropriate, within a range not to impair effect of the present invention (for example, the various foaming agents in equal to or lower than 30 parts by weight, the hydrophilic polymer in equal to or lower than 30 parts by weight, and the chain transfer agent in equal to or lower than 1 part by weight relative to 100 parts by weight of the monomer).

Polymerization temperature in the polymerization step is not especially limited, but, setting at usually 10 to 140° C. is preferable. The polymerization temperature below 10° C. not only lengthens polymerization time and decreases productivity but also could deteriorate property of the water-absorbing resin. On the other hand, the polymerization temperature over 140° C. could deteriorate property of the water-absorbing resin. Polymerization time is also not especially limited, and may be determined as appropriate depending on kinds of the monomers and the polymerization initiator, polymerization temperature, or the like. In addition, the above-described polymerization is performed usually under normal pressure, in view of easiness of the apparatus and the operation thereof, and however, in order to decrease boiling point in polymerization system, it is also a preferable aspect that this polymerization is performed under reduced pressure.

In this production step, in view of performance and easiness of polymerization control, for example, after mixing sodium persulfate as the thermal decomposition-type initiator and L-ascorbic acid as the reducing agent, into a monomer solution composed of an aqueous solution of a partial sodium salt of acrylic acid containing polyethylene glycol diacrylate as the internal cross-linking agent, this mixed solution may be supplied to a flat plane steel belt having a weir at the side, and aqueous solution polymerization may be performed continuously on this belt. Such a polymerization method is called belt polymerization. As a polymerization method other than this belt polymerization, continuous kneader polymerization described in Example 1 of U.S. Pat. No. 6,867,269 may be used. The water-absorbing resin having desired performance can be obtained in this case as well.

That is, in the present invention, it is preferable that the polymerization step is performed by continuous kneader polymerization or continuous belt polymerization. In such a case, irregular pulverized shaped particles with high property are obtained in high productivity in the subsequent drying step or the like, but, the fine powders or powder dust tend to generate in the subsequent pulverization step or the like. However, in order to solve such problems, the present invention can be applied suitably. The continuous kneader polymerization has been disclosed, for example, in U.S. Pat. No. 6,987,151 and U.S. Pat. No. 6,710,141. In addition, the continuous belt polymerization has been disclosed, for example, in U.S. Pat. No. 4,893,999, U.S. Pat. No. 6,241,928, and US-A-2005-215734 or the like.

[The Drying Step]

The drying step is the step for drying the polymer gel (water-containing gel-like polymer) obtained in the above-described polymerization step. Preferably, the polymer gel obtained the polymerization step is usually subjected to crushing treatment to make a particle state of about 0.1 to 5 mm and supplied to the drying step. Because surface area of the gel increases by making particulate gel, the drying step can progress smoothly. The crushing means is not especially limited, and, for example, various cutting means such as a meat chopper, a roller-type cutter, a guillotine cutter, a slicer, a roll cutter, a shredder, scissors, or the like may be used alone or in combination as appropriate. A drying method in this drying step is not especially limited, and a method using a usual dryer or a heating furnace as the drying apparatus $4b$ is adopted widely, and for example, one or two or more kinds of a band drier, an agitated drier, a fluid bed drier or the like can be used suitably. As drying temperature, setting at relatively high temperature is preferable, specifically 100 to 250° C. is preferable, 120 to 220° C. is more preferable, and 150 to 200° C. is further preferable. Drying time is not especially limited, and, it may be set under such time so as to attain desirable solid content rate of the resultant dried substance. It is preferable that solid content rate (remained amount after heated at 180° C. for 3 hours) of the dried substance obtained in the drying step is equal to or higher than 90% by mass, in view of easiness of pulverization. In general, in view of production efficiency, it is preferable that the drying time is usually within two hours, although it depends on particle diameter of the polymer gel, drying temperature, air volume or the like.

That is, increase in the solid content rate of the dried substance obtained in the drying step tends to generate the fine powders or powder dust easily in pulverization. However, in order to solve such a problem, the present invention can be applied suitably in drying under condition of high temperature and high solid content.

[The Pulverization Step]

The pulverization step is the step for pulverizing a polymer gel or a dried substance thereof. Pulverization is usually performed for a dried substance of the polymer gel obtained in the drying step, but, it may be performed for the polymer gel obtained in the polymerization step before drying. By this pulverization, the particulate water-absorbing resin as the pulverized substance is obtained. Pulverization is preferably performed so that the particulate water-absorbing resin with desired particle diameter (preferably, a weight average particle diameter of 200 to 800 μm) can be obtained as many as possible. A method for pulverization is not especially limited, and a conventionally known method can be adopted. As the pulverization apparatus $4c$, for example, a roll mill, a knife mill, a hammer mill, a pin mill, a jet mill, or the like is exemplified. Because this pulverization generates the fine powders, the fine powders are included in the particulate water-absorbing resin obtained in the pulverization step.

That is, the particulate water-absorbing resin obtained by the pulverization step becomes irregular pulverized shaped particles. Such a shape is preferable due to providing large specific surface area, and makes fixing to pulp easy as well. In addition, in the pulverization step, the fine powders or powder dust (dust) easily generate, however, because of enabling to solve such a problem, the present invention can be applied preferably.

[The Classification Step]

The classification step is the step for classifying a pulverized substance obtained in the above-described pulverization step. In the classification step, the pulverized substance is sieved. In this classification step, by selecting particles having desired particle diameter (preferably, a weight average particle diameter of 200 to 800 μm), the objective particulate water-absorbing resin can be obtained. A classification method is not especially limited, and a conventionally known method can be adopted. The classification apparatus $4d$ for performing the classification step is not especially limited, and, it is preferable that sieve classification (a metal sieve, made of stainless steel) is used. In addition, it is preferable that multiple pieces of the sieves are used at the same time in the classification step to obtain objective property and particle size. It should be noted that, in this classification step, the particulate water-absorbing resin contained as the fine powders in the pulverized substance, may be obtained as a residual substance.

[The Surface Cross-Linking Step]

In the present invention, it is preferable that the surface cross-linking step is performed after the classification step. The surface cross-linking step is the step for cross-linking the neighborhood of the surface of the particulate water-absorbing resin obtained in the above-described classification step, using a surface cross-linking agent, to obtain the particulate water-absorbing agent. The "surface cross-linking" means to increase cross-link density at the surface of the particulate water-absorbing resin. "The neighborhood of the surface" indicates a part of the surface layer of the particulate water-absorbing resin, and a part with a thickness of equal to or less than several tens μm or equal to or less than $1/10$ of total thickness, and, this thickness is determined as appropriate depending on objectives. Such a surface cross-linking can be confirmed by decrease in absorbency against non-pressure (CRC) from that of the water-absorbing resin before the surface cross-linking step.

As the surface cross-linking agent to be used in the surface cross-linking step, a conventionally known surface cross-linking agent exemplified in U.S. Pat. No. 6,228,930, U.S. Pat. No. 6,071,976, U.S. Pat. No. 6,254,990 or the like is used suitably. It is preferable to use one or two or more kinds of a surface cross-linking agent having dehydration esterification reactivity, selected from a group consisting of an oxazolidinone compound, an alkylene carbonate compound, a polyvalent alcohol compound, and an oxetane compound. In such a surface cross-linking step, although the particulate water-absorbing agent with high property is obtained, it is necessary to perform the dehydration esterification reaction under high temperature condition, which decreases water content of the particulate water-absorbing agent. Therefore, although the fine powders or powder dust may sometimes generate, in order to solve such problems, the present invention can be applied suitably.

Specifically, although not limited, they include an (mono-, di- or poly-)oxazolidinone compound such as 2-oxazolidinone, or the like (U.S. Pat. No. 6,559,239); an alkylene carbonate compound such as 1,3-dioxolane-2-one, 4-methyl-1, 3-dioxolane-2-one, 4,5-dimethyl-1,3-dioxolane-2-one, 4,4-di-methyl-1,3-dioxolane-2-one, 4-ethyl-1,3-dioxolane-2-one, 4-hydroxymethyl-1,3-dioxolane-2-one, 1,3-dioxane-2-one, 4-methyl-1,3-dioxane-2-one, 4,6-dimethyl-1,3-dioxane-2-one, 1,3-dioxolane-2-one, or the like (U.S. Pat. No. 5,409,771); a polyhydric alcohol compound such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerin, polyglycerin, 2-butene-1,4-diol, 1,4-butanediol, 1,5-pentanediol, 1,6-hexanediol, 1,2-cyclohexanedimethanol, 1,2-cyclohexanediol, trimethylol propane, diethanol amine, triethanol amine, polyoxypropylene, an oxyethylene-oxypropylene block copolymer, pentaerythritol, sorbitol, or the like; an oxetane compound (US-A-2002/72471). Among them, at least one kind selected from the polyhydric alcohol having carbon atoms of 2 to 10, and the oxetane compound having carbon atoms of 2 to 10 are more preferable. The polyhydric alcohol having carbon atoms of 3 to 8 is particularly preferable. In addition to these, an epoxy compound such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether, glycidol, or the like; a polyvalent amine compound such as ethylenediamine, diethylenetriamine, triethylenetetramine, tetraethylenepentamine, pentaethylenehexamine, polyethyleneimine, or the like, or an inorganic salt or an organic salt (an aziridinium salt or the like) thereof; a polyvalent isocyanate compound such as 2,4-tolylene diisocyanate, hexamethylene diisocyanate, or the like; a polyvalent oxazoline compound such as 1,2-ethylenebis-oxazoline, or the like; a halo-epoxy compound such as epichlorohydrin, epibromohydrin, α-methylepichlorohydrin, or the like; a polyvalent metal compound such as a hydroxide or chloride of zinc, calcium, magnesium, aluminum, iron, zirconium or the like; or the like may be used. These surface cross-linking agents may be used alone, or in consideration of reactivity, two or more kinds may be used by mixing. It should be noted that, the surface cross-linking step may be performed two or more times in consideration of effect thereof, and in that case, as the surface cross-linking agent to be used in and after the second time, the same surface cross-linking agent as used in the first time may be used, or the surface cross-linking agent different from that used in the first time may be used.

In the surface cross-linking step, use amount of the above-described surface cross-linking agent depends on the surface cross-linking agent selected. However, use amount from 0.001 part by weight to 10 parts by weight is preferable, and from 0.01 part by weight to 5 parts by weight is more preferable, relative to 100 parts by weight of solid content of the particulate water-absorbing resin. By using the surface cross-linking agent in this range, cross-link density of the neighborhood of the surface of the particulate water-absorbing agent can be made higher than that of the inside. The case where the use amount of the surface cross-linking agent exceeds 10 parts by weight is not only uneconomical but also makes excessive supply of the cross-linking agent for forming an optimal cross-link structure to the particulate water-absorbing resin, and is thus not preferable. The case where the use amount of the surface cross-linking agent is below 0.001 part by weight does not provide sufficient improvement effect in enhancing performance of absorbency against pressure or the like of the particulate water-absorbing agent, and is thus not preferable.

In the surface cross-linking step, it is preferable to use water as a solvent in mixing the particulate water-absorbing resin and the surface cross-linking agent. Use amount of water depends on kind of the water-absorbing resin, particle diameter, and water content of the particulate water-absorbing resin or the like. However, use amount over 0 part by weight and equal to or lower than 20 parts by weight is preferable, and use amount within a range of 0.5 to 10 parts by weight is more preferable, relative to 100 parts by weight of solid content of the particulate water-absorbing resin. In mixing the particulate water-absorbing resin and the surface cross-linking agent, a hydrophilic organic solvent may be used in combination, as needed. In this case, as the hydrophilic organic solvent to be used in combination, for example, lower alcohols such as methyl alcohol, ethyl alcohol, n-propyl alcohol, isopropyl alcohol, n-butyl alcohol, isobutyl alcohol, t-butyl alcohol, or the like; ketones such as acetone, or the like; ethers such as dioxane, tetrahydrofuran, or the like; amides such as N,N-dimethylformamide, or the like; sulfoxides such as dimethylsulfoxide, or the like; or the like is included. Use amount of the hydrophilic organic solvent depends on kind of the water-absorbing resin, particle diameter and water content of the particulate water-absorbing resin or the like. However, use amount from 0 to equal to or lower than 20 parts by weight is preferable, and use amount within a range of 0 to 10 parts by weight is more preferable, relative to 100 parts by weight of solid content of the particulate water-absorbing resin.

In performing surface cross-linking, the following method is preferable, wherein, after getting the aqueous solution, in which a water and/or a hydrophilic organic solvent, and a surface cross-linking agent has been mixed in advance, and then the solution thereof is mixed by spraying or dropping to the particulate water-absorbing resin, and a method for mixing by spraying is more preferable. Size of a droplet sprayed is preferably within a range of 0.1 to 300 μm, and more preferably within a range of 0.1 to 200 μm, as an average particle diameter.

For mixing the particulate water-absorbing resin with the surface cross-linking agent, water and hydrophilic organic solvent, the mixing apparatus 4e is used. This mixing apparatus 4e is preferably provided with a large mixing force to mix both uniformly and surely. As the mixing apparatus 4e, for example, a cylinder-type mixing machine, a double wall cone-type mixing machine, a high speed stirring-type mixing machine, a V-type mixing machine, a ribbon-type mixing machine, a screw-type mixing machine, a twin arm-type kneader, a pulverizing-type kneader, a rotation-type mixing machine, an air flow-type mixing machine, Turbulizer, a batch-type Rhedige mixer, a continuous Rhedige mixer or the like is suitable.

In the surface cross-linking step, the surface cross-linking reaction can progress even at room temperature. However, in view of promotion of the reaction as well as removal of water and solvent added, it is preferable that, after mixing the particulate water-absorbing resin and the surface cross-linking agent, further heating treatment is performed to cross-link the neighborhood of the surface of the particulate water-absorbing resin. That is, in order to react the cross-linking agent on the neighborhood of the surface of the particulate water-absorbing resin, it is preferable for the heating treatment to be performed, in consideration of the reactivity of the cross-linking agent, and easiness and productivity of the production facility. In the heating treatment, treatment temperature is preferably equal to or higher than 80° C., although it depends on the surface cross-linking agent selected. The treatment temperature of below 80° C. takes longer time in the heating treatment, and thus not only incurs decrease in productivity but also cannot attain uniform surface cross-linking. In this case, concerned is that not only absorption characteristics under pressure of the particulate water-absorbing agent decreases, but also the unreacted surface cross-linking agent remains. The treatment temperature over 250° C. incurs deterioration of the particulate water-absorbing resin, and decreases performance of the particulate water-absorbing agent surface cross-linked, and is thus not preferable. From this viewpoint, the treatment temperature (temperature of a heating medium or temperature of a material/in particular, temperature of the heating medium) is preferably in a range of 100 to 250° C., more preferably in a range of 150 to 250° C. (in particular, it is suitable for the surface cross-linking agent having dehydration esterification reactivity). Heating time is preferably in a range of 1 minute to 2 hours. Suitable examples of a combination of heating temperature and heating time are for 0.1 to 1.5 hour at 180° C. and for 0.1 to 1 hour at 200° C.

As the heating apparatus 4f for performing the heating treatment, a conventional dryer or a heating furnace is used. For example, a dryer or a heating furnace of a conductive heat transfer-type, a radiation heat transfer-type, a hot air heat transfer-type, an inductive heating-type is suitable. Specifically, a dryer or a heating furnace of a belt-type, a groove stirring-type, a screw-type, a rotation-type, a disk-type, a kneading-type, a fluid bed-type, an air flow-type, an infrared ray-type, an electron beam-type is included.

In the surface cross-linking step, the heating treatment may be performed in a static state or under stirring. When the heating treatment is performed under stirring, the surface cross-linking may be completed by heating the mixture in the mixing apparatus, where the particulate water-absorbing resin and the surface cross-linking agent were mixed, or the surface cross-linking may be completed by heating the mixture, by charging the mixture, for example, into a twin-screw groove-type agitated drying apparatus.

[The Cooling Step]

The cooling step is the step performed arbitrarily after the surface cross-linking step, for example, the step disclosed in U.S. Pat. No. 6,378,453. This cooling step is the step wherein the particulate water-absorbing agent obtained by heating and cross-linking the neighborhood of the surface in the above-described surface cross-linking step is cooled before charging to the granule sizing step to be described later. The cooling apparatus 4g to be used in this cooling step is not especially limited, and, for example, a twin-screw agitated dryer or the like, where cooling water is passed through inside of the inner wall or other heat transfer surfaces can be used. Temperature of this cooling water is set at below heating temperature, preferably equal to or higher than 25° C. and below 80° C. In the surface cross-linking step, there may be the case where surface cross-linking of the particulate water-absorbing resin is performed at room temperature. In this case, because the particulate water-absorbing agent obtained by the surface cross-linking is not heated, this cooling step may not be performed. This cooling step is other step which may be included further in this production method, as needed.

[The Addition Step of Additives]

In the present invention, the addition step for adding additives other than the surface cross-linking agent may be installed further. This addition step is preferably installed at and after the polymerization step, and more preferably installed at and after the drying step. The additives may be added in the cooling step or other steps. As the additives, for example, the following (A) a deodorant component (preferably, a plant component), (B) a polyvalent metal salt, (C) an inorganic particle (including (D) a composite water-containing oxide), (E) a liquid permeability improver, (F) other additives and the like may be added. By this addition, various functions can be furnished to the particulate water-absorbing agent. Further, the following (G) chelating agent may be added to the particulate water-absorbing agent. In the step for using such additives, the water-absorbing agent with high property (for example, high SFC) can be obtained. However, the additives themselves can become powder dust. Therefore, in order to solve such problems, the present invention can be applied suitably.

In this production method, use amount of the (A) to (E) and (F) differs depending on objectives and functions to be furnished, however, it is usually, as addition amount of one kind thereof, in a range of 0.001 to 10 parts by weight, preferably 0.001 to 5 parts by weight, and further preferably 0.002 to 3 parts by weight, relative to 100 parts by weight of the water-absorbing resin. Usually, when this addition amount is lower than 0.001 parts by weight, sufficient effect and functions to be furnished by the additives cannot be obtained, and when this addition amount is over 10 parts by weight, effect comparable to the addition amount cannot be obtained or water absorbing performance decreases.

(A) The Deodorant Component

The particulate water-absorbing agent obtained by the production method of the present invention can be formulated with the deodorant component, preferably the plant component, in the above-described amount, to exert deodorant property. As the plant component, at least one kind of a compound selected from polyphenol, flavone (s), and caffeine is preferable, and at least one kind of a compound selected from tannin, tannic acid, gall, gallnut and gallic acid is further preferable. As a plant containing the plant component which can be added to the particulate water-absorbing agent, other than these plant components, for example, *camellia, Eurya japonica, Ternstroemia gymnathera* or the like is included as the Theaceous plant; rice, bamboo grass, bamboo, corn, wheat or the like is included as the Poaceae plant, and coffee or the like is included as the Rubiaceae plant. As a form of the plant component, which can be used in the present invention, essence (essential oil) extracted from a plant, a plant itself, a plant residue or an extract residue by-produced in the production process in plant processing industry or food processing industry, or the like is included, but it is not especially limited.

(B) The Polyvalent Metal Salt

The polyvalent metal salt may be formulated into the particulate water-absorbing agent obtained by the production method of the present invention, in order to enhance liquid permeability and powder hygroscopic fluidity. Preferable amount of this polyvalent metal salt is as described above. As this polyvalent metal salt, a polyvalent metal salt of an organic acid and a polyvalent metal salt of an inorganic acid are exemplified. As the preferable inorganic polyvalent metal salt, for example, aluminum chloride, aluminum polychloride, aluminum sulfate, aluminum nitrate, potassium aluminum bissulfate, sodium aluminum bissulfate, potassium alum, ammonium alum, sodium alum, sodium aluminate, calcium chloride, calcium nitrate, magnesium chloride, magnesium sulfate, magnesium nitrate, zinc chloride, zinc sulfate, zinc nitrate, zirconium chloride, zirconium sulfate, zirconium nitrate or the like is included. In addition, in view of solubility with an absorbing liquid such as urine, use of a salt having crystal water thereof is preferable. A particularly preferable one is an aluminum compound. Among this aluminum compound, aluminum chloride, aluminum polychloride, aluminum sulfate, aluminum nitrate, potassium aluminum bissulfate, sodium aluminum bisulfate, potassium alum, ammonium alum, sodium alum, sodium aluminate are preferable, and aluminum sulfate is particularly preferable. Powders of water-containing crystal such as aluminum sulfate-octadeca hydrate salt, aluminum sulfate-tetradeca to octadeca hydrate salt may be used most suitably. They may be used as only one or two more kinds may be used in combination. In view of handling property and mixing property with the particulate water-absorbing agent, the polyvalent metal salt is used preferably in a solution state, and is used particularly preferably in an aqueous solution state.

In addition, polyvalent metal salts of organic acids to be used, and mixing methods thereof are exemplified, for example, in U.S. Pat. No. 7,282,262. As the polyvalent metal salt of the organic acid, having carbon atoms of equal to or more than 7 in the molecule, to be used in the present invention, a metal salt other than an alkaline salt, of an aliphatic acid, a petroleum acid, a polymer acid or the like, is included. As an organic acid composing a polyvalent metal salt of this organic acid, an aliphatic acid having a long chain or a branched chain, such as capronic acid, octylic acid, octynoic acid, decanoic acid, lauric acid, myristic acid, palmitic acid, oleic acid, stearic acid, or the like; a petroleum acid such as benzoic acid, myristicinic acid, naphthenic acid, naphthoic acid, naphthoxyacetic acid, or the like; a polymer acid such as poly(meth)acrylic acid, polysulfonic acid, or the like can be exemplified. However, an organic acid having a carboxyl group in the molecule is preferable, and an aliphatic acid such as capronic acid, octylic acid, octynoic acid, decanoic acid, lauric acid, myristic acid, palmitic acid, oleic acid, stearic acid, a cow aliphatic acid, a castor oil hardened aliphatic acid is more preferable. An aliphatic acid not having an unsaturated bond in the molecule, such as capronic acid, octanoic acid, decanoic acid, lauric acid, myristic acid, palmitic acid, or stearic acid is further preferable. And a long chain aliphatic acid with carbon atoms of equal to or more than 12, not having an unsaturated bond in the molecule, such as lauric acid, myristic acid, palmitic acid, and stearic acid is most preferable.

(C) The Inorganic Particle

The inorganic particle, in particular, a water-insoluble inorganic particle may be formulated into the particulate water-absorbing agent obtained by the production method of the present invention in order to prevent blocking in moisture absorption. As the inorganic particle to be used in the present invention, specifically, for example, a metal oxide such as silicon dioxide, titanium oxide, or the like; silicic acid (salt) such as natural zeolite, synthetic zeolite, or the like; kaolin, talc, clay, bentonite or the like is included. Among these, silicon dioxide and silicic acid (salt) are more preferable, and silicon dioxide and silicic acid (salt), having an average particle diameter of 0.001 to 200 μm, measured by the Coulter counter method, is further preferable.

(D) The Composite Water-Containing Oxide

The particulate water-absorbing agent obtained by the production method of the present invention shows superior hygroscopic fluidity (fluidity of powders after the water-absorbing resin or the water-absorbing agent absorbed moisture), and further, in order to make exert superior deodorant function, a composite water-containing oxide containing zinc and silicon, or a composite water-containing oxide containing zinc and aluminum may be formulated.

(E) The Liquid Permeability Improver

The liquid permeability improver means the additive such as a water-insoluble inorganic fine particle, a water-soluble polyvalent metal salt, a water-soluble polymer, polyamine, for enhancing saline flow conductivity (SFC) of the water-absorbing resin or the water-absorbing agent having a saline flow conductivity (SFC) of equal to or higher than $6 (\times 10^{-7} \cdot cm^3 \cdot s \cdot g^{-1})$ to be described later, by equal to or higher than $10 (\times 10^{-7} \cdot cm^3 \cdot s \cdot g^{-1})$. Therefore, even the additives exemplified in the (A) to (D) may correspond to this liquid permeability improver. In this production method, this liquid permeability improver is preferably a water-soluble polyvalent metal compound or a polycation compound. Specifically, it is preferably a compound of one or more kinds selected from a group consisting of an aluminum compound, a zirconium compound, a titanium compound, and a compound having an amino group. In more specifically, for example, the water-soluble polyvalent metal compound such as aluminum sulfate, potassium alum, ammonium alum, sodium alum, (poly)aluminum chloride, a hydrate thereof, or the like; the polycation compound such as the polymeric polyamine compound, preferably the water-soluble polymeric polyamine, more specifically, polyethyleneimine, polyvinylamine, polyallylamine, or the like having a weight average molecular weight of 200 to 1000000; the water-insoluble inorganic fine particle such as silica, alumina, bentonite, or the like; or the like is included, and they may be used as only one kind, or may be used in two or more kinds in combination. Among these, the water-soluble polyvalent metal salt such as aluminum sulfate, potassium alum or the like is preferable in view of enhancing saline flow conductivity (SFC). In addition, the liquid permeability improver is preferably an aqueous solution, in view of easily adding more uniformly to the whole surface of the water-absorbing resin, and having no segregation or the like of the liquid permeability improver. The liquid permeability improver is used preferably in a ratio of 0.001 to 10% by weight, and more preferably in a ratio of 0.01 to 5% by weight, relative to the water-absorbing resin.

(F) Other Additives

To the particulate water-absorbing agent obtained by the production method of the present invention, as needed, for example, a disinfectant, an antimicrobial agent, perfume, various inorganic powders, a foaming agent, a pigment, a dye, a hydrophilic staple fiber, a fertilizer, an oxidizing agent, a reducing agent, water-soluble salts, or the like may be added, as appropriate, in a range not to impair effect of the present invention (for example, equal to or less than 30 parts by weight, and further equal to or less than 10 parts by weight, relative to 100 parts by weight of the particulate water-absorbing agent), and by this various functions can be furnished.

(G) The Chelating Agent

The particulate water-absorbing agent to be used in the present invention may contain the chelating agent. The mixing step of the chelating agent is not especially limited, but, it is preferable that the chelating agent is mixed to the monomer or monomer solution. As the chelating agent, a polymer chelating agent and a non-polymer chelating agent are exemplified. Preferably the non-polymer chelating agent containing an acid group, and further preferably, the non-polymer chelating agent containing a phosphoric acid group or a carboxylic acid group is used. Number of the acid group contained in this non-polymer chelating agent is 2 to 100, further preferably 2 to 50, and particularly preferably 2 to 10. As this chelating agent, a non-polymer chelating agent containing nitrogen is used, or a chelating agent containing nitrogen may also be used suitably. As this chelating agent, for example, an amino carboxylic acid-type metal chelating agent such as iminodiacetic acid, hydroxyethyliminodiacetic acid, nitrilotriacetic acid, nitrilotripropionic acid, ethylenediamine tetraacetic acid, hydroxyethylenediamine triacetic acid, hexamethylenediamine tetraacetic acid, diethylenetriamine pentaacetic acid, triethylenetetramine hexacetic acid, trans-1,2-diaminocyclohexane tetraacetic acid, bis(2-hydroxyethyl)glycin, diaminopropanol tetraacetic acid, ethylenediamine-2-propionic acid, glycol ether diamine tetraacetic acid, bis(2-hydroxybenzyl)ethylenediamine diacetic acid, and a salt thereof; and a phosphorous compound such as ethylenediamine-N,N'-di(methylenephosphinic acid), ethylenediamine tetra(methylenephosphinic acid), nitriloacetic acid-di(methylenephosphinic acid), nitrilodiacetic acid-(methylenephosphinic acid), nitriloacetic acid-β-propionic acid-methylenephosphonic acid, nitrilo tris(methylenephosphonic acid), cyclohexanediamine tetra(methylenephosphonic acid), ethylenediamine-N—N'-diacetic acid-N,N'-di(methylenephosphonic acid), ethylenediamine-N—N'-di(methylenephosphonic acid), ethylenediamine tetra(methylenephosphonic acid), polymethylenediamine tetra(methylenephosphonic acid), diethylenetriamine penta(methylenephosphonic acid), and 1-hydroxyethylidene diphosphonic acid, and a salt thereof; are included. Use amount of the chelating agent is preferably from 10 ppm by weight to 1000 ppm by weight, relative to 100 parts by weight of the water-absorbing resin.

The additives exemplified in the (B) to (E) may be added as an aqueous solution or a water dispersion solution. In addition, when these additives are solid, they may be subjected to dry mixing into the water-absorbing resin, as powders (preferably having a particle diameter of equal to or smaller than 300 μm).

In addition, the (B) and (E) can be used suitably as a surface treatment agent. Surface treatment in the present application means that a region of the surface or the neighborhood of the surface of the water-absorbing resin has been surface cross-linked by chemical or physical modification. In this case, chemical modification means a state of modification accompanying with any of a chemical bonding, and physical modification means physical covering or attachment without accompanying with the chemical bonding. Bonding form in the surface treatment is not especially limited. In addition, the surface treatment is a concept including the surface cross-linking. Further, the surface treatment includes surface cross-linking with ionic bond of a surface carboxyl group by a polyvalent metal, such as trivalent aluminum, in addition to the surface cross-linking by the above cross-linking agent. These surface treatments are chemical modification accompanying with chemical bonding such as covalent bond or ionic bond with the water-absorbing resin. On the other hand, physical modification indicates a modified state of the same surface or the neighborhood of the surface of the water-absorbing resin modified only by physical attachment, without taking a form of chemical bonding such as covalent bond or ionic bond with the water-absorbing resin. Such a state is also included in the surface treatment in the present application. For example, the above-described state covered with the polyvalent alcohol, or a state covered with the water-soluble polyvalent metal salt without accompanying with chemical bonding is a surface treated state.

In particular, in the present invention, the polyvalent metal salt is preferable as the additives for enhancing liquid permeability. It is preferable that the polyvalent metal salt is mixed after the addition. As an apparatus for mixing, for example, a cylinder-type mixing machine, a screw-type mixing machine, a screw-type extruder, Turbulizer, Nauta-type mixing machine, a V-type mixing machine, a ribbon-type mixing machine, a twin arm-type kneader, a fluidized-type mixing machine, an air flow-type mixing machine, a rotating disk-type mixing machine, a roll mixer, a rolling-type mixing machine, Rhedige mixer, or the like may be included.

It should be noted that, the polyvalent metal salt is preferably mixed with the water-absorbing resin as an aqueous solution. Size of a droplet of the aqueous solution can be adjusted as appropriate. In view of preventing permeation and diffusion of a polyvalent metal ion (for example, an aluminum ion) into the inside of the water-absorbing resin, the aqueous solution preferably has a concentration of equal to or higher than 50%, more preferably equal to or higher than 60%, further preferably equal to or higher than 70%, further preferably equal to or higher than 80%, and particularly preferably equal to or higher than 90%, relative to saturated concentration at the predetermined temperature. Naturally, it may be an aqueous solution having the saturated concentration (=100% relative to the saturated concentration), or a dispersion solution having over the saturated concentration. Temperature of the aqueous solution is adjusted as appropriate in a range of equal to or lower than boiling point to adjust solubility or viscosity, and however, mixing is usually performed at about room temperature.

[The Granule Sizing Step]

In the present invention, the granule sizing step may be provided. Although the particle diameter was adjusted in the above-described pulverization step and classification step, an aggregated substance having large particle diameter might be included in the particulate water-absorbing agent after the cooling step. This aggregated substance may be generated principally during mixing the surface cross-linking agent, or during a surface cross-linking reaction. In this granule sizing step, the particle size is re-adjusted, crushing treatment and classification treatment of this aggregated substance is performed. Such a granule sizing method has been disclosed in U.S. Pat. No. 7,347,330, US-A-2005-011325 or the like. Order and number of this granule sizing treatment and classification treatment is not especially limited. In this granule sizing step, for example, firstly the classification treatment is performed for the particulate water-absorbing agent. In this classification treatment, a classification apparatus such as a sieve or an air flow classification machine can be used. In this classification treatment, for example, by using a sieve having large sieve mesh size, the aggregated substance having large particle diameter can be obtained. In this way, after the aggregated substance having large particle diameter is removed, the fine powders having small particle diameter are removed by using a sieve having small sieve mesh size. For the aggregated substance obtained by this classification treatment, the crushing treatment is performed. By this crushing treatment, particles composing the aggregated substance can be crushed and separated to an individual particle, and the particulate water-absorbing agent as a single particle can be obtained. In this crushing treatment, for example, a knife cutter-type crushing machine is used. For the crushed substance obtained by this crushing treatment, the classification treatment is performed again. In this granule sizing step, while the fine powders having small particle diameter are removed, the particulate water-absorbing agent having desired particle diameter (preferably, a weight average particle diameter of 200 to 800 µm) can be obtained. In view of productivity, this granule sizing step is preferably performed after the cooling step. In this production method, an apparatus to be used in this crushing treatment and an apparatus to be used in the classification treatment configure the granule sizing apparatus $4h$. It should be noted that, in this granule sizing step, the particulate water-absorbing agent contained as the fine powders may be obtained as a residual substance.

[The Packaging Step]

In the present invention, the packaging step may be provided after the granule sizing step. The packaging step is the step for filling a packaging material container with the particulate water-absorbing agent granule-sized in the above-described granule sizing step for packaging. For example, in this packaging step, the particulate water-absorbing agent transferred to a hopper fills the packaging material container, by use of the filling apparatus $4i$. As the packaging material container, for example, a storing bag such as a flexible container bag or the like is used. In this production method, the particulate water-absorbing agent filling the storing bag is shipped as a product after the predetermined inspection.

[The Transporting Step]

In this production method, the transporting step is the step for transporting a product such as the polymer gel, the particulate water-absorbing resin, the particulate water-absorbing agent, or the like generated in each of the steps to the other steps. In this transporting step, for example, by controlling pressure in the pipeline 8 which connects each of the apparatuses themselves installed at each of the steps, a product generated in one step is transported to other step. In this production method, for example, a product such as the polymer gel, the particulate water-absorbing resin, the particulate water-absorbing agent or the like is transported by pneumatic transportation. It should be noted that, instead of the pneumatic transportation, a transportation machine such as a conveyor may be used. That is, by connecting the apparatus to be used at one step and the apparatus to be used at other step via a transportation machine such as a conveyor, a product generated in one step may be transported to other step. Further in the transporting step, the transportation may be performed by free falling utilizing gravitational force. In this production method, for example, the polymer gel generated in the polymerization step is transported to the drying apparatus $4b$ by the transporting step. A dried substance of the polymer gel dried in the drying step is transported to the pulverization apparatus $4c$ by the transporting step. The particulate water-absorbing resin obtained in the pulverization step is transported to the classification apparatus $4d$ by the transporting step. The particulate water-absorbing resin sieved in the classification step is transported to the mixing apparatus $4e$ by the transporting step. The particulate water-absorbing agent cross-linked at the surface part thereof in the surface cross-linking step is transported to the cooling apparatus $4g$ by the transporting step. The particulate water-absorbing agent cooled in the cooling step is transported to the granule sizing apparatus $4h$ by the transporting step. Alternatively, the particulate water-absorbing agent obtained from the particulate water-absorbing resin sieved in the classification step is transported to the granule sizing apparatus $4h$ by the transporting step. The particulate water-absorbing agent granule sized in the granule sizing step is transported to the filling apparatus $4i$ by the transporting step. Alternatively, the particulate water-absorbing agent cooled in the cooling step is transported to the filling apparatus $4i$ by the transporting step. In this production method, even in the case where the step other than the above steps is included, it is preferable that a product produced in this other step is transported to each of the steps by the transporting step. According to this production method, the particulate water-absorbing agent may be produced continuously. Each step other than the transporting step may be connected directly, but, it is preferably connected via the transporting step. Accordingly, it is preferable that the transporting steps are present in a number equivalent to the number of the steps other than the transporting steps. From this viewpoint, the number of the transporting step is preferably equal to or more than 2, more preferably equal to or more than 3, more preferably equal to or more than 4, and more preferably equal to or more than 5. The upper limit of the number of the transporting step is determined as appropriate, and, for example, it is set at equal to or less than 30, and further equal to or less than 20. Transportation apparatuses to be used in a plurality of the transporting steps may be the same apparatus, or different apparatuses.

[The Collection Step]

It is preferable that the production method of the present invention includes the collection step. As described above, in this production method, the fine powders generate by pulverizing the dried polymer gel in the pulverization step. The fine powders generate also by crushing processing in the granule sizing step. Further, the fine powders might also generate by wear or the like of the particulate water-absorbing resin and the particulate water-absorbing agent during transportation in the transporting step. Further, the fine powders may also generate when the particulate water-absorbing agent suffers damage in a process including and subsequent to the heating process in the surface cross-linking step. Further, in observing the substance captured by an apparatus to be described later, by use of a scanning electron microscope, an X-ray micro-analyzer or the like, the aggregated substance (dust) of inorganic fine particles, composed of silicon dioxide or the like, having a longer diameter of from 20 µm to 100 µm, might be present in the fine powders. Presence of such an aggregated substance (dust) is caused by the additives and dust in gas. By the collection step, such an aggregated substance (dust) may also be removed in addition to the fine powders (water-absorbing resin). By removing this aggregated substance (dust), work environment can be enhanced. In addition, removal of this aggregated substance (dust) can contribute to enhancement of property of the particulate water-absorbing agent.

In this production method, the fine powders are present in any of the steps. The fine powders may be contained in gas present in the apparatus where the step is performed, and in the pipeline 8. In this production method, the fine powders are contained in gas of inside of the step, in any of the steps. The collection step is the step for collecting the fine powders in gas by use of the trapping material. As described above, in this collection step, the fine-powder capturing apparatus 6 is used. The fine-powder capturing apparatus 6 has an apparatus which can suck the gas. By this suction of gas, reduced pressure state can be attained. In addition, by making thus suctioned gas pass through the trapping material, the fine powders can be captured. In this production method, the fine powders are transported to the fine-powder capturing apparatus 6 by the transporting step. The fine-powder capturing apparatus 6 may be used as a single unit, or as two or more units.

The fine powders are those having smaller particle diameter than that of the particulate water-absorbing agent aiming to obtain by the production method of the present invention, and conventionally, they have been usually treated as waste materials. As will be described later, weight average particle diameter (D50) of the particulate water-absorbing agent (specified by the JIS standard sieve classification) is preferably 200 to 800 µm, and for example, weight average particle diameter (D50) of the particulate water-absorbing agent obtained by the production method of the present invention is preferably 200 to 450 µm. The fine powders are residue after removal so that weight average particle diameter (D50) of the obtained particulate water-absorbing agent becomes within a desired range. Specifically, weight average particle diameter (D50) of the fine powders is in range of 10 to 150 µm. Preferably, it is desirable that the fine powders contain particles having a particle diameter (specified by the JIS standard sieve classification) of practically below 150 µm, in 70 to 100% by mass, further 90 to 100% by mass. In addition, as shape of the fine powders, one with a sphere obtained by reversed phase suspension polymerization, and one with an irregular shape obtained by aqueous solution polymerization are included. In addition, the fine powders may be one being subjected or not subjected to the surface cross-linking treatment, or may be a mixture thereof.

Preferably, the fine-powder capturing apparatus 6 is provided with the trapping material. This trapping material is a filter. This trapping material is configured so that particles (the fine powders and the like) contained in this gas can be removed by passage of the gas. Preferably, as this trapping material, a bag filter is used. This bag filter is a cylindrical bag having an opening at one side.

In this production method, this fine-powder capturing apparatus 6 is jointed to any of the apparatuses used in the above steps and the pipelines, which connect them, by the first pipeline 8a. In the fine-powder capturing apparatus 6 shown in FIG. 1, the first pipeline 8a is connected to at least any of the positions shown by the arrow lines S1 to S20 in FIG. 1. This first pipeline 8a may be connected to any of S1 to S20, or may be connected to a plurality of positions among S1 to S20, or may be connected to all of S1 to S20. This connected position is determined as appropriate in consideration of generation state of the fine powders. By this connection, the fine powders present in any of the steps are transported to this fine-powder capturing apparatus 6 through the first pipeline 8a. This first pipeline 8a may be branched so as to be able to be connected to a plurality of positions.

In this production method, gas is introduced to the fine-powder capturing apparatus 6 through the first pipeline 8a. In this introduction, reduced pressure state to be described later may be utilized. This gas passes through the trapping material. By this passing through, the fine powders are captured with the trapping material. Gas passed through this trapping material is exhausted outside of this fine-powder capturing apparatus 6. The fine powders captured with the trapping material are sieved off, for example, by vibration. The fine powders may be sieved off by blowing pulsed air. And preferably, the fine powders sieved off are transported to the granulation apparatus 4j to be described later through the second pipeline 8b. This fine-powder capturing apparatus 6 is superior in collecting efficiency of the fine powders. According to this production method, the fine powders generating in the production process are collected efficiently while preventing the scattering thereof.

In this production method, the fine powders collected with this fine-powder capturing apparatus 6 are exhausted through the second pipeline 8b. Preferably, this fine-powder capturing apparatus 6 is connected to the granulation apparatus 4j for performing the granulation step, by the second pipeline 8b. Detail of the granulation step will be described later. The granulated substance obtained by granulating the fine powders is jointed to any of the apparatuses to be used in the steps, via the pipeline 8. In the fine-powder capturing apparatus 6 shown in FIG. 1, the granulation apparatus 4j is connected to the pipeline 8 which connects the polymerization apparatus 4a and the drying apparatus 4b. In this way, the fine powders granulated are charged to the drying step through the second pipeline 8b. In this production method, the fine powders can be reused without being disposed. This reuse may contribute to reduction of production cost.

In this production method, even when humidity is present inside the step, this humidity can be exhausted effectively. Accordingly, aggregation of the particulate water-absorbing resins themselves or attachment of the particulate water-absorbing resin to the apparatus or the like is suppressed, which can stabilize production. Further, in this production method, because gas, from which fine powders are removed, is exhausted outside, swirling up of the fine powders as dust can be suppressed. In this production method, good work environment can be maintained.

Further, in this production method, because the fine powders are removed efficiently from the particulate water-absorbing agent, the particulate water-absorbing agent superior in properties such as absorbency against pressure and liquid permeation can be obtained. In addition, because this production method is superior in trapping efficiency of the fine powders, by effective reuse of the fine powders thus collected, effect in view of production cost, that is, reuse of the fine powders, can be obtained as well.

In this production method, it is preferable that the trapping material superior in trapping efficiency of JIS 12-type carbon black (particle diameter: 0.03 μm to 0.2 μm) is used in the fine powder capturing apparatus 6. The fine powder capturing apparatus 6 provided with trapping material having high trapping efficiency can prevent deterioration of work environment caused by exhaust of the fine powders, as well as can collect the fine powders efficiently. From this viewpoint, this trapping efficiency is preferably equal to or higher than 90%, more preferably equal to or higher than 95%, still preferably equal to or higher than 99.9%, and particularly preferably equal to or higher than 99.99%.

The trapping efficiency of the trapping material is measured by a method, for example, JIS B9908:2001 type 1. This trapping efficiency can be obtained substantially, based on amount of dust before passing through the trapping material and amount of dust after passing through that, which is measured by a commercial dust meter. Specifically, by measuring amount of the dust in the first pipeline 8a of FIG. 1, amount of the fine powders W0 (mg/m$^3$) before passing through the trapping material is obtained. By measuring amount of the dust in the second pipeline 8b, amount of the fine powders Wf (mg/m$^3$) after passing through the trapping material is obtained. By using W0 and Wf obtained in this way, the trapping efficiency is calculated, based on the following calculation expression. It should be noted that, as this dust meter, for example, a product name "P5L Digital Dust Meter", manufactured by Shibata Scientific Technology, Ltd. is included. In addition, the dust measured here includes the fine powders and the aggregates of the water-absorbing resin.

Trapping efficiency(%)=(1−Wf/W0)×100    [Expression 1]

When the fine powders reach inside the trapping material, the fine powders clog the trapping material. By this clogging, the gas becomes difficult to pass through this trapping material. From this viewpoint, as the trapping material, it is preferable that the fine powders capture the fine powders at the surface thereof. Use of such a trapping material not only traps the fine powders stably but also can reduce exchange frequency of this trapping material. The production method including the collection step of the fine powders by such a trapping material can contribute to productivity of the particulate water-absorbing agent. The trapping material is not especially limited, and for example, a filter cloth or a membrane filter made of woven fabric or nonwoven fabric is included, and in particular, the membrane filter is preferable. This membrane filter includes the membrane and the substrate. The membrane contains many fine pores or fine clearances. These pores or clearances are continuous in the thickness direction. This membrane can make gas passed through. The membrane is laminated on the substrate. The substrate can support the membrane. Although not shown, the substrate contains many fine pores or fine clearances. This substrate can make gas passed through. Size of the pores or clearances contained in the membrane is smaller than particle diameter of the fine powders generating in production of the particulate water-absorbing agent. Specifically, size (pore size) of the pores or clearances contained in the membrane is 0.1 to 20 μm, and thickness of the membrane is 0.01 to 1 mm. In addition, size (pore size) of the pores or clearances contained in the substrate is not especially limited, as long as it is larger than that of the pores or clearances contained in the membrane. Thickness of the substrate is 1 to 5 mm. In such a range, the fine powders do not enter into the membrane, and therefore, the fine powders carried to the fine powder capturing apparatus contained in the gas can be captured at the surface of this membrane.

In this production method, because the fine powders are captured at the surface of the membrane, they are hard to reach the substrate through the membrane. Because intrusion of the fine powders into the inside of the membrane filter is suppressed, clogging of the membrane filter caused by the fine powders can be prevented. That is, in this membrane filter, because the fine powders captured at the surface of the membrane are removed simply by physical impact (for example, pulse wave), difference between mass before using the membrane and mass after using the membrane is small. In this production method, amount per unit hour (hereafter, permeation flux) of the gas passing through this membrane filter is easy to be maintained suitably. Therefore, this membrane filter can contribute to decrease in pressure loss of this fine powder capturing apparatus 6. This membrane filter can reduce running cost. In this way, this production method is superior in productivity. In this production method, because the fine powders are removed efficiently from the particulate water-absorbing agent, the particulate water-absorbing agent superior in properties such as absorbency against pressure, liquid permeability or the like can be obtained.

In view of being able to obtain a large permeation flux, as for the substrate, woven fabric, nonwoven fabric, sponge or the like is exemplified. In view of versatility, as this substrate, nonwoven fabric is preferable. As a material of this substrate, polyester, polypropylene, polyacrylonitrile, nylon, polytetrafluoroethylene, polyphenylenesulfide, glass fiber, aramid fiber and polyimide are exemplified. The material of this substrate may be determined as appropriate in consideration of operation condition or the like of the fine powder capturing apparatus 6.

In the production method of the present invention, a material of the membrane is not especially limited, and, in view of being capable of easy shaking off the fine powders (superior in dust release) captured at the surface of the membrane, it is particularly preferable to be polytetrafluoroethylene. The membrane filter provided with this membrane made of polytetrafluoroethylene can contribute to enhancement of trapping efficiency of the fine powders by this fine powder capturing apparatus. Such a membrane filter can reduce running cost further. This production method is superior in productivity. In this production method, because the fine powders are removed efficiently from the particulate water-absorbing agent, the particulate water-absorbing agent superior in properties such as absorbency against pressure, liquid permeability or the like can be obtained.

As described above, in this production method of the present invention, the polyvalent metal salt or the inorganic particle may be formulated to the particulate water-absorbing agent, in the cooling step. This formulation prevents blocking of the particulate water-absorbing agent. Also in this case, because the membrane of the membrane filter can capture the fine powders at the surface thereof, intrusion of the fine powders into the inside of the membrane filter can be suppressed. By use of this membrane filter, exchange frequency of the trapping material in the fine powder capturing apparatus 6 can be reduced further. Therefore, this membrane filter can reduce running cost. In this way, this production method is superior in productivity.

[The Granulation Step]

The preferable production method of the present invention includes the granulation step. The granulation step is the step for obtaining the granulated particle by adding an aqueous liquid to the fine powders. The fine powders can be obtained at the classification step, the granule sizing step and the collection step. From the viewpoint of enhancing the recovery rate of the fine powders, it is preferable that all of the fine powders collected by the collection step can be supplied to this granulation step. The granulated particle is composed of a plurality of the fine powders. Weight average particle diameter of the granulated particle is equal to or smaller than 20 mm, preferably 0.3 to 10 mm, and more preferably 0.35 to 5 mm. Preferably, this granulated particle is charged to the drying step, and dried in the co-presence of the polymer gel. As described later, preferably, in this granulation step, the fine granules captured by a suction to perform the reduced pressure, is used. That is, it is preferable that in this granulation step, the fine powders collected by the collection step are used.

In this granulation step, it can be confirmed that a granulated substance generated is the granulated particle from the fact that a plurality of individual particles gather together while maintaining shape thereof and aggregates, or from the fact that they swell as a plurality of discontinuous particles in absorbing a solution, with an optical microscope.

In this granulation step, in view of drying load, the granulated particle has a water content of preferably equal to or lower than 75% by weight, more preferably equal to or lower than 70% by weight, and further preferably equal to or lower than 65% by weight (the lower limit is over 0% by weight, and preferably equal to or higher than 5% by weight). When the water content of the granulated particle is extremely higher than that of the polymer gel, drying could be partially incomplete when this granulated particle and the polymer gel are dried in a co-present state.

A solvent of the aqueous liquid to be used in this granulation step is not especially limited and, for example, water, an aqueous solution containing a hydrophilic organic solvent (for example, lower alcohols such as methyl alcohol, ethyl alcohol, n-propyl alcohol, isopropyl alcohol, n-butyl alcohol, isobutyl alcohol, t-butyl alcohol, or the like; ketones such as acetone or the like; ethers such as dioxane, tetrahydrofuran, or the like; amides such as N,N-dimethylformamide or the like; sulfoxides such as dimethylsulfoxide or the like) is included. From a view of property or granulation strength, it is desirable that the aqueous liquid contains water preferably in 90 to 100% by weight, and more preferably in 99 to 100% by weight, and is particularly preferably composed of only water. In the aqueous liquid, the additives may be dissolved into the solvent. The additives are at least one or more kind of additives selected from the group consisting of a thermal decomposition-type radical polymerization initiator, an oxidizing agent and a reducing agent. In addition, other additives such as a cross-linking agent, a chelating agent, a surfactant, or the like may be contained in the aqueous liquid in small amount within a range not to impair effect of the present invention. For example, as the cross-linking agent, the cross-linking agent as described above may be used. By containing the cross-linking agent in the aqueous liquid, reduction of water-soluble components, or enhancement of granulation strength can be expected.

In this granulation step, as the thermal decomposition-type radical polymerization initiator which can be used as the additive, the thermal decomposition-type initiator exemplified in the polymerization step may be used preferably in a similar way. Among these, a peroxide is preferable, and a persulfate salt such as sodium persulfate is particularly preferable. These thermal decomposition-type radical polymerization initiators may be only one or two or more kinds. The oxidizing agent is not especially limited as long as it can react with the monomer, while drying the granulated particle and the polymer gel in a co-present state. As this oxidizing agent, for example, an inorganic oxidizing agent such as a chlorate salt, a bromate salt, a chlorite salt, a hypochlorite salt, or the like; the persulfate salt or hydrogen peroxide exemplified also as the thermal decomposition-type radical polymerization initiator; an inorganic peroxide or an organic peroxide such as t-butyl peroxide, benzoyl peroxide, or the like; or the like is included. Among these, the persulfate salt or hydrogen peroxide is preferable, and the persulfate salt is particularly preferable. These oxidizing agents may be only one or two or more kinds. The reducing agent is not especially limited, and may be an organic reducing agent or an inorganic reducing agent. As this reducing agent, the inorganic reducing agent is preferable, and a sulfur-type, a phosphorous-type, or a nitrogen-type reducing agent is particularly preferable. Specifically, the reducing agent exemplified in the polymerization step may be used preferably in a similar way. Among these, the sulfur-type reducing agent, in particular, a sulfite salt, a hydrogen sulfite salt, a pyrosulfite salt, or a dithionite salt is preferable, and as a salt thereof, a sodium salt, a potassium salt, or an ammonium salt is preferable. Among these, sodium sulfite, or sodium hydrogen sulfite is particularly preferable. These reducing agents may be only one or two or more kinds. As this additive, among those described above, the thermal decomposition-type radical polymerization initiator is preferable, and in particular, use of the persulfate salt as the additive is preferable in view of exerting superior reducing effect of the residual monomer.

In this granulation step, content of the additive in the aqueous liquid is not especially limited, and, it is preferably 0.0001 to 1% by weight relative to the fine powders. The content below 0.0001% by weight could not decrease the residual monomer sufficiently, while, the content over 1% by weight could generate coloring in the final particulate water-absorbing agent obtained after drying. In addition, the additive (in particular, the thermal decomposition-type radical polymerization initiator) may be used in the polymerization step in some cases. In that case, content of the additive in the aqueous liquid, relative to the amount of the fine powders before granulation, is preferably 1 to 500% by weight, more preferably 5 to 400% by weight, and further preferably 10 to 300% by weight, relative to the amount (the amount per unit weight of the monomer component) of the additive added in the polymerization step. It should be noted that, when the additive is used in the polymerization step, the additive added in the polymerization step and the additive contained in the aqueous liquid may be the same kind or may be different kinds.

In the granulation step, use amount of the aqueous liquid is not especially limited, and, from 25 parts by weight to 280 parts by weight, relative to 100 parts by weight of the fine powders is preferable. More preferably, it is equal to or lower than 200 parts by weight, and further preferably, it is equal to or lower than 150 parts by weight. The use content of the aqueous liquid of over 280 parts by weight results in providing a unified giant gel-like substance with high water content, and thus it becomes necessary to further dry and pulverize this gel-like substance to make the granulated particle, and also, it requires tremendous load in drying. On the other hand, when the use amount of the aqueous liquid is less than 25 parts by weight, granulation strength becomes insufficient, and could not exert superior characteristics in a final product, as well as makes mixing inhomogeneous and therefore could make granulation difficult.

In this granulation step, when the fine powders are granulated, it is enough to mix the fine powders and the aqueous liquid, but, in particular, in the granulation, it is preferable that the aqueous liquid is heated in advance, and further it is a preferable aspect that granulation is performed by high speed mixing of said aqueous liquid heated and the fine powders. In this way, the granulated particle with directly controlled particle diameter can be obtained without making the unified giant gel-like substance, and as a result, it becomes not necessary to obtain the granulated particle by further drying and pulverizing the gel-like substance, and also, a problem caused when the unified giant gel-like substance is obtained, that is, a problem that since force required for mixing becomes enormous or the gel-like substance is kneaded in a bulk state, generation of scission or entanglement of a main chain causes deterioration of the particulate water-absorbing agent itself.

In this granulation step, in a preferable aspect of the granulation, temperature in heating the aqueous liquid is usually equal to or higher than 40° C., preferably equal to or higher than 50° C., more preferably equal to or higher than 60° C., and further preferably equal to or higher than 70° C. In addition, the upper limit of this temperature is equal to or lower than boiling point of the aqueous liquid, and the boiling point may be adjusted variously by adding salts or other solvents, or by changing pressure (reduced pressure, pressurization) or the like, but, because there is no big change even when the temperature is over 100° C., it is performed usually at equal to or lower than 100° C. It should be noted that, when the aqueous liquid is heated in advance, it is preferable that the additive is made separately as the aqueous liquid with relatively high concentration at room temperature or under cooling, and then this aqueous liquid is mixed with a relatively large quantity of the residual part of the aqueous liquid, which has been heated in advance, just before mixing with the fine powders.

In this granulation step, in a preferable aspect of the granulation, it is preferable that the aqueous liquid is heated in advance, and further the fine powders themselves are heated in advance. Temperature in heating these fine powders is also usually equal to or higher than 40° C., and preferably equal to or higher than 50° C. Because there is no big change even when the temperature is over 100° C., it is performed usually at equal to or lower than 100° C. It should be noted that, when the fine powders themselves are heated in advance, means thereof is not especially limited, and for example, they may be heated by drying and then retaining heat, or they may be heated separately from outside.

In this granulation step, in a preferable aspect of the granulation, the aqueous liquid and the fine powders heated are subjected to high speed mixing. High speed mixing means that time for completing mixing of the aqueous liquid and the fine powders, and then forming the granulated particle is short time. That is, it means that time from the point when the aqueous liquid and the fine powders contact to the point when the granulated particle forms, in other word, mixing time is short time. This mixing time is preferably equal to or shorter than 3 minutes, more preferably equal to or shorter than 1 minute, and most preferably 1 second to 60 seconds. When mixing time is longer, uniform mixing of the aqueous liquid and the fine powders becomes difficult, and it tends to provide the unified giant gel-like substance. In addition, when mixing time is longer, the additives contained in the aqueous liquid may decompose before the granulated particle generated and the polymer gel together are supplied to the drying step, and sufficient amount of the additive might not be present in the drying step. Further, continuing mixing for a long time could incur decrease in performance of the particulate water-absorbing agent, such as increase in water-soluble components or decrease in absorbency against pressure of the particulate water-absorbing agent obtained after completion of mixing.

In this granulation step, as a means to attain high speed mixing, charging the aqueous liquid heated all at once to the fine powders under stirring, is included. That is, in the case where the aqueous liquid is added gradually, for example, by a method such as spraying, the fine powders become a giant aggregated mass or kneaded on the way, and thus could cause deterioration of the particulate water-absorbing agent. Time for charging the heated aqueous liquid is preferably equal to or shorter than 60 seconds, further preferably equal to or shorter than 30 seconds, and most preferably equal to or shorter than 10 seconds. In addition, as a means for attaining high speed mixing, to the contrary from the above, there is also included a method for charging the fine powders in the heated aqueous liquid under stirring. Also in this cases, time for charging the fine powders is preferably equal to or shorter than 60 seconds, further preferably equal to or shorter than 30 seconds, and most preferably equal to or shorter than 10 seconds. In addition, as a means for attaining high speed mixing, there is also included a method for mixing the fine powders and the heated aqueous liquid at the same time all at once. Also in this cases, time for charging both is preferably equal to or shorter than 60 seconds, further preferably equal to or shorter than 30 seconds, and most preferably equal to or shorter than 10 seconds. In addition, it is also possible to obtain the granulated particles continuously by charging both continuously at the same time, and mixing in high speed. It should be noted that, as described above, in consideration of decomposition of the additive, it is preferable that time for making the granulated particles and the polymer gel coexist and drying is as short as possible, and when the polymer gel is obtained continuously in the polymerization step, it is a preferable aspect that the granulated particle is mixed thereto continuously, and send it to the drying step in a short period.

(The Particulate Water-Absorbing Agent)

Weight average particle diameter (D50) specified by JIS standard sieve classification of the particulate water-absorbing agent obtained by the production method of the present invention, is preferably 200 to 800 μm, more preferably 200 to 450 μm, more preferably 220 to 430 μm, and further preferably 250 to 400 μm. In addition, the particulate water-absorbing agent of the present invention can exert effect most, when it has specific particle diameter distribution. As for the preferable particle diameter distribution, particles occupying within the upper and the lower limit of 850 to 150 μm (specified by the JIS standard sieve; Z8801-1 (2000)), that is, ratio of particles having the weight average particle diameter (D50) of 150 to 850 μm, is preferably 90 to 100% by weight, further preferably 95 to 100% by weight, and particularly preferably from 98 to 100% by weight, relative to total of the water-absorbing agent. And, a substance passing 150 μm, that is, content of the fine powders having the weight average particle diameter of below 150 μm contained in the particulate water-absorbing agent, is preferably below 1% by weight, more preferably below 0.5% by weight, relative to total mass of the particulate water-absorbing agent. The particle diameter distribution is preferably in a specific range. Logarithm standard deviation (σζ) thereof is set to preferably 0.20 to 0.50, and further preferably 0.30 to 0.40. When the weight average particle diameter (D50), the content rate of particles below 150 μm, and the logarithm standard deviation (σζ) of particle diameter are outside the range, liquid permeability and water absorbing speed might decrease. It should be noted that, the logarithm standard deviation and the weight average particle diameter are specified by the specification of US-A-2006/0204755.

It should be noted that, particle shape of the particulate water-absorbing agent or the particulate water-absorbing resin relevant to the present invention is not especially limited. As this particle shape, spherical-shape, nearly spherical-shape, irregular pulverized shaped (which is a pulverized substance), bar shape, polygonal shape, sausage shape (for example; U.S. Pat. No. 4,973,632), a particle with wrinkles (for example; U.S. Pat. No. 5,744,564) or the like is included. They may be a single particle, or a granulated particle or a mixture of the single particle and the granulated particle. In addition, the particle may be foamed porous one. Preferably, a single particle with irregular pulverized shaped shape or a granulated substance thereof is included.

In view of malodor and hygiene, amount of the residual monomer of the particulate water-absorbing agent is preferably 0 to 500 ppm, more preferably 0 to 400 ppm, more preferably 0 to 300 ppm, more preferably 0 to 250 ppm, more preferably 0 to 200 ppm, further preferably 0 to 150 ppm, and particularly preferably 0 to 100 ppm. When a principal component of the monomer used in the polymerization is acrylic acid and/or a salt thereof, it is preferable that content of the unreacted acrylic acid and/or the salt thereof is equal to or less than 500 ppm. In measurement of amount of the residual monomer, 0.5 g of the water-absorbing agent is added to 1000 g of deionized water in a plastic container having a cap, and stirred for 2 hours. After stirring, the swelled and gelled water-absorbing agent is filtered with a filter paper, and analyzed with liquid chromatography. On the other hand, solutions with known concentrations of the monomer (acrylic acid) are similarly analyzed, and the resultant calibration curve is used as an external standard. Based on this external standard, amount of the residual monomer is determined in consideration of dilution rate of a filtrate.

As described above, the present invention provides a novel particulate water-absorbing agent having the following properties, which is composed principally of surface cross-linked polyacrylic acid (salt) based water-absorbing resin. In addition, one having the following properties exerts effect of the present invention significantly. Further, the present invention can be applied preferably for the production method for the particulate water-absorbing agent having the following properties.

Absorbency against non-pressure (CRC) of the particulate water-absorbing agent for a normal saline solution is preferably equal to or higher than 15 g/g. In general, when the particulate water-absorbing agent having the absorbency against non-pressure of below 15 g/g is used in absorbent articles such as disposable diapers, it could not provide high property. On the other hand, because the higher is the absorbency against non-pressure, the higher property of the absorbent articles is obtained, the upper limit thereof is not especially limited, but, in view of production difficulty as well as cost increase, it is preferable to be equal to or lower than 60 g/g. This absorbency against non-pressure is more preferably 15 to 50 g/g, and particularly preferably 25 to 35 g/g.

The particulate water-absorbing agent obtained by the production method of the present invention has AAP (Absorbency against Pressure) for a normal saline solution under pressure of 4.8 kPa, is preferably equal to or higher than 15 g/g, more preferably equal to or higher than 22 g/g, further preferably equal to or higher than 24 g/g and most preferably equal to or higher than 25 g/g. In general, when the particulate water-absorbing agent having the absorbency against pressure of below 15 g/g is used in absorbent articles such as disposable diapers, it could not provide high property. On the other hand, because the higher is the absorbency against pressure, the higher property of the absorbent articles is obtained, the upper limit thereof is not especially limited, but, in view of production difficulty as well as cost increase, the upper limit of the absorbency against pressure is preferably equal to or lower than 35 g/g.

The absorbency against pressure (AAP) can be obtained in accordance with a method described in U.S. Pat. No. 6,071,976. In more detail, absorbency against pressure (value at 60 minute) for a normal saline solution under 50 g/cm$^2$ (4.8 kPa), has been measured. This measurement is performed under an environment of 23±2° C.

Liquid permeation (SFC) of the particulate water-absorbing agent obtainable by the production method of the present invention is a value representing liquid permeation on swelling of the particulate water-absorbing agent or the water-absorbing agent. The larger is the value of this liquid permeation (SFC), the particulate water-absorbing agent has the higher liquid permeation. By removal of the fine powders, value of liquid permeation (SFC) can be increased. This liquid permeation (SFC) is preferably equal to or higher than 30 ($\times 10^{-7} \cdot cm^3 \cdot s \cdot g^{-1}$), more preferably equal to or higher than 50 ($\times 10^{-7} \cdot cm^3 \cdot s \cdot g^{-1}$). When liquid permeation (SFC) is below 30 ($\times 10^{-7} \cdot cm^3 \cdot s \cdot g^{-1}$), in the case where concentration of the particulate water-absorbing agent in the absorbent articles such as disposable diapers is equal to or higher than 30% by mass, in more specifically, in the case of equal to or higher than 50% by mass, absorption speed of urine could decrease and incur leakage. In the present application, this liquid permeation (SFC) is also called saline flow conductivity.

In this production method, from the viewpoint that superior properties of the above-described particulate water-absorbing agent can be stably maintained, as well as blocking can be prevented, it is preferable that dried gas is passed in each of the steps. As this gas, one having a dew point of equal to or lower than −30° C. is preferable, one having equal to or lower than −35° C. is more preferable, and one having equal to or lower than −40° C. is particularly preferable. When it is difficult to pass dried gas, it is preferable that heated gas is passed. A heating method is not especially limited, but, the gas may be heated directly by using a heat source, and the gas to be passed may be heated indirectly by heating each apparatus or the pipeline 8 or the like installed between each of the steps. Temperature of this heated gas is preferably equal to or higher than 30° C., more preferably equal to or higher than 50° C., and further preferably equal to or higher than 70° C.

In the present invention, at least one step of the steps is set under reduced pressure state. One example of the present invention includes the polymerization step for obtaining the polymer gel, the drying step for drying the polymer gel to obtain a dried substance, the pulverization step for pulverizing the dried substance or the polymer gel to obtain the particulate water-absorbing resin, the classification step for sieving the particulate water-absorbing resin, the transporting step for transporting the products produced in each of the steps to other steps, and other step which may be contained further, and is a production method for the particulate water-absorbing agent, wherein one or more steps selected from the pulverization step, the classification step, the other step which may be included further, and the transporting step after the pulverization step are set under reduced pressure state. The other step which may be included further are, for example, one or more steps selected from the granule sizing step, the surface cross-linking step, the cooling step and the packaging step. The other step which may be included further is not essential in the present invention.

Which of the steps is set under reduced pressure state is not limited. Preferably, the pulverization step is set under reduced pressure state. Preferably, the classification step is set under reduced pressure state. Preferably, the granule sizing step is set under reduced pressure state. Preferably, the transporting step next to the pulverization step is set under reduced pressure state. Preferably, the transporting step after the pulverization step is set under reduced pressure state. Preferably, the transporting step between the pulverization step and the classification step is set under reduced pressure state. Preferably, one or more steps selected from the pulverization step, the classification step, the granule sizing step, the transporting step after the pulverization step are set under reduced pressure state. The surface cross-linking step and the packaging step may be set under reduced pressure state. Preferably, the pulverization step, the classification step, the granule sizing step, and the transporting step between these steps are set under reduced pressure state. In particular, in the steps including and subsequent to the pulverization step, the fine powders easily float. In this production method, gas (air) containing the fine powders may leak out from each apparatus or pipeline or the like. When gas containing the fine powders leaked out, amount of the fine powders contained in air inside a plant increases, and thus may deteriorate work environment. In addition, leakage of air containing the fine powders may decrease recovery rate of the fine powders. By setting the reduced pressure state, the leakage from the apparatus or pipeline or the like can be suppressed effectively. In addition, by this reduced pressure state, gas (air) containing the fine powders can be introduced effectively to the fine-powder capturing apparatus 6. In this case, it is preferable that the fine-powder capturing apparatus 6 is provided with a pressure reducing apparatus. This pressure reducing apparatus is an apparatus enabling to generate reduced pressure state. This pressure reducing apparatus can generate reduced pressure state by suction of gas. Because by this pressure reducing apparatus, air inside each step is suctioned to the fine-powder capturing apparatus 6, capturing of the fine powders by the fine-powder capturing apparatus 6 can be attained effectively. It is preferable that, in at least one step in the steps after the pulverization step, inside of the step is set under reduced pressure state.

In particular, in the pulverization step, the fine powders scatter easily. Therefore, it is preferable that the pulverization step is set under reduced pressure state. In addition, it is general that the granule sizing step has the step for crushing the fine powders, and in this crushing step, usually a pulverization machine is used. When the pulverization machine is used in the granule sizing step, scattering of the fine powders generates easily. Therefore, it is preferable that the granule sizing step is set under reduced pressure state. In this way, it is preferable that the step accompanying with pulverization of the water-absorbing resin or the water-absorbing agent is set under reduced pressure state.

It should be noted that, when the fine powders are granulated and reused as above, it is preferable that the granulated particle containing the fine powders is charged, for example, into the drying step. In this case, the fine powders may separate again from the granulated particle in some cases. In addition, in the granulation step, the fine powders may remain without being granulated in some cases. Therefore, in the step at or after charging the granulated particle, the fine powders may float in air in some cases. From such a viewpoint, the step before the pulverization step may be set under reduced pressure state. In addition, in FIG. 1, the transporting step (the fine powders transporting step) from the classification apparatus 4d to the granulation apparatus 4j may be set under reduced pressure state, or the transporting step (the fine powders transporting step) from the granule sizing apparatus 4h to the granulation apparatus 4j may be set under reduced pressure state. In this way, for example, the pressure reducing apparatus may be installed at one or more positions between the step S1 and the step S20 of FIG. 1. In view of enhancing effect caused by reduced pressure, preferably, the pressure reducing apparatus is installed at two or more positions, more preferably four or more positions between the step S1 and the step S20 of FIG. 1. In view of economic performance, the pressure reducing apparatus is installed at 20 or less positions, more preferably at 10 or less positions between the step S1 and the step S20 of FIG. 1.

The pressure reducing apparatus is not especially limited, as long as it can attain reduced pressure state. This pressure reducing apparatus may be an exhaust apparatus for performing simply exhaust, or may be a suction exhaust apparatus for exhausting this gas after making the suctioned gas pass through a filter. By this exhaust, humidity inside the step can be removed effectively. The fine-powder capturing apparatus 6 provided with the pressure reducing apparatus is the suction exhaust apparatus provided with the filter being able to capture the fine powders. As the exhaust apparatus, an exhaust fan or an exhaust blower is exemplified. It should be noted that, in adjusting the degree of reduced pressure as appropriate depending on the step or the apparatus, in view of increasing the degree of reduced pressure to decrease the fine powders, the exhaust blower is preferable.

Figure 2:
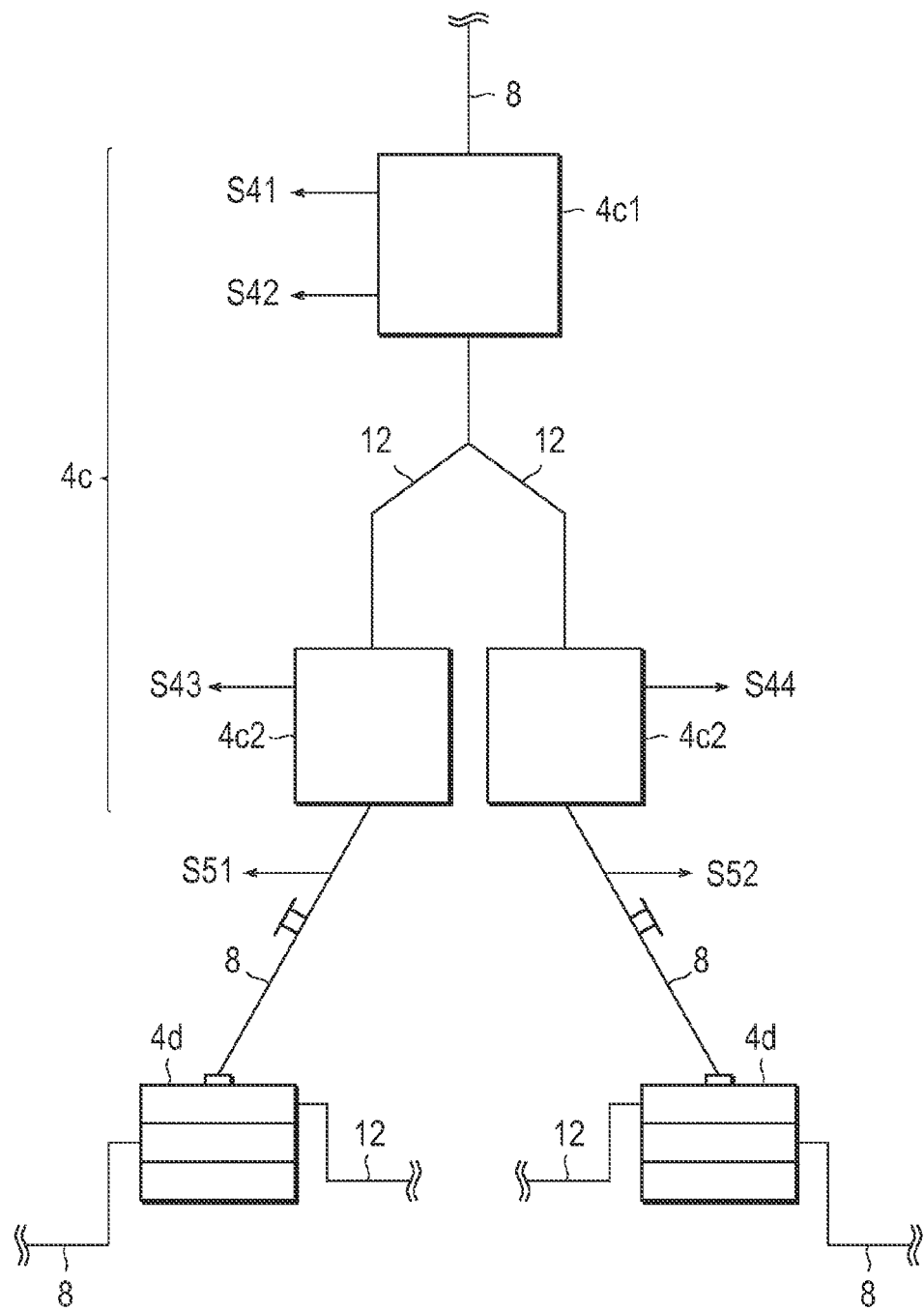
FIG. 2 is a drawing showing a schematic configuration of a pulverization apparatus and a classification apparatus contained in the production facility of FIG. 1.

FIG. 2 is a drawing showing one example of a schematic configuration of the pulverization apparatus 4c and the classification apparatus 4d in the facility 2. The pulverization apparatus 4c has a first pulverization apparatus 4c1, a second pulverization apparatus 4c2 and a pipeline in the step 12. The classification apparatus 4d may be installed in two units.

In the present embodiment, the two-stage pulverization step is performed. To the first pulverization apparatus 4c1, a dried substance supplied to the drying step is transported. By this first pulverization apparatus 4c1, the first stage of the pulverization step is performed, and the first pulverized substance is obtained. This first pulverized substance is supplied to the second pulverization apparatus 4c2 via the pipeline in the step 12. The second pulverization apparatus 4c2 is installed in two units. The pipeline in the step 12 is branched, and the first pulverized substance is supplied to each of the two units of the second pulverization apparatus 4c2. By the second pulverization apparatus 4c2, the first pulverized substance is pulverized more finely to obtain the second pulverized substance. This second pulverized substance is supplied to the classification apparatus 4d. To the two units of the classification apparatus 4d, the second pulverized substance is supplied. Among the classified substances classified with the classification apparatus 4d, one having a desired particle diameter is supplied to the surface cross-linking step (the mixing apparatus 4e). In addition, among the classified substances, one having too small particle diameter is supplied to the granulation step (the granulation apparatus 4j) as a fine powder. Among the classified substances, one having too large particle diameter is supplied again to the first pulverization apparatus 4c1.

Those shown by the arrow marks in FIG. 2 are positions where the exhaust apparatus is installed. As shown by the arrow marks S41 and S42, the exhaust apparatus is installed to the first pulverization apparatus 4c1. In the first pulverization apparatus 4c1, the exhaust apparatus is installed at two positions. As shown by the arrow marks S43 and S44, the exhaust apparatus is installed to the second pulverization apparatus 4c2. Further, as shown by the arrow marks S51 and S52, the exhaust apparatus is installed to the pipeline 8 which connects the second pulverization apparatus 4c2 and the classification apparatus 4d. The apparatuses and pipelines where this exhaust apparatus is installed are set under reduced pressure state. In this way, in the embodiment of FIG. 2, the transporting step performed next to the pulverization step is set under reduced pressure state. In this way, the pressure reducing apparatus such as the exhaust apparatus may be installed to each apparatus or each pipeline of the production facility. To the pipeline in the step 12, the pressure reducing apparatus may be installed. One unit of the exhaust apparatus may be installed at one exhaust position, or one unit of the exhaust apparatus may be connected to a plurality of exhaust positions. It should be noted that, when the pressure reducing apparatus is installed to the pipeline in the step, it means that the step including the pipeline in the relevant step is set under reduced pressure state.

FIG. 3 is a drawing showing one example of a schematic configuration of the granule sizing apparatus 4h in the facility 2. The granule sizing apparatus 4h has a hopper 4h1, a pulverizing machine 4h2, a classification apparatus 4h3, a hopper 4h4 and the pipeline in the step 12.

The particulate water-absorbing agent passed through the cooling step is stored temporarily in the hopper 4h1. Next, the particulate water-absorbing agent is sent from the hopper 4h1 to the pulverizing machine 4h2. The particulate water-absorbing agent crushed by this pulverizing machine 4h2 is sent to the classification apparatus 4h3. Among the substances classified by the classification apparatus 4h3, one having a desired particle diameter is sent to the filling apparatus 4i. In addition, among the classified substances, one having too small particle diameter is sent to the granulation apparatus 4j via the hopper 4h4, as the fine powders. Among the classified substances, one having too large particle diameter is transported again to the pulverizing machine 4h2. This transportation is performed by a conveyer 14. That is, the too large classified substance is returned from the classification apparatus 4h3 to the pulverizing machine 4h2 via the conveyer 14.

Those shown by the arrow marks in FIG. 3 are positions where the exhaust apparatus is installed. As shown by the arrow mark S141, the exhaust apparatus is installed to the hopper 4h1. As shown by the arrow mark S142, the exhaust apparatus is installed to the pulverization machine 4h2. As shown by the arrow mark S143, the exhaust apparatus is installed to the pipeline in the step 12 which uses the conveyer 14 as the transportation means. As shown by the arrow mark S144, the exhaust apparatus is installed to the hopper 4h4. The hopper 4h4 is a hopper for storing the fine powders. The apparatuses and pipelines where this exhaust apparatus is installed are set under reduced pressure state. In this way, the pressure reducing apparatus such as the exhaust apparatus can be installed to each apparatus or each pipeline of the production facility. One unit of the exhaust apparatus may be installed at one exhaust position, or one unit of the exhaust apparatus may be connected to a plurality of exhaust positions.

A treatment method for gas exhausted by the exhaust apparatus explained in FIG. 2 and FIG. 3, is not limited. This exhausted gas may be sent to the fine-powder capturing apparatus 6, or may be subjected to other treatment. The exhausted gas may be exhausted only to the outside of the step. By this exhaust, humidity inside the step can be removed effectively.

By the exhaust apparatus, inside of the step is set under reduced pressure state. In the present application, "inside of the step" is a concept including the following (a) to (c):

(a) inside of the apparatus or pipeline or the like for performing the step thereof.

(b) inside of an enclosure covering the apparatus or pipeline or the like for performing the step thereof.

(c) inside of a room where the apparatus or pipeline or the like for performing the step thereof is positioned.

When the apparatus or pipeline or the like has substantially closed space, and reduced pressure in the apparatus is possible, the (a) can be adopted. When reduced pressure in the apparatus itself is difficult, the (b) or (c) may be adopted.

"A reduced pressure state" means that a pressure is lower state than atmospheric pressure. In addition, "degree of reduced pressure relative to atmospheric pressure" means pressure difference from atmospheric pressure, and when the pressure is lower than atmospheric pressure, it is expressed as a positive (plus) value. For example, when atmospheric pressure is standard atmospheric pressure (101.3 kPa), "the degree of reduced pressure of 10 kPa" means that the pressure is 91.3 kPa. In the present application, "degree of reduced pressure relative to atmospheric pressure" may be called simply "degree of reduced pressure".

In view of enhancing the effect caused by reduced pressure, the lower limit of the degree of reduced pressure is preferably over 0 kPa, more preferably equal to or higher than 0.01 kPa, and more preferably equal to or higher than 0.05 kPa. In view of suppressing flying of powders in the system, and in view of suppressing excessive cost for the exhaust apparatus, the upper limit value of the degree of reduced pressure is preferably equal to or lower than 10 kPa, more preferably equal to or lower than 8 kPa, further preferably equal to or lower than 5 kPa, and far preferably equal to or lower than 2 kPa. A preferable range of the numerical value of the degree of reduced pressure may be selected arbitrarily between the lower limit value and the upper limit value.

Because the production method relevant to the present invention includes the step under reduced pressure state, the particulate water-absorbing agent can be produced continuously and stably. This production method is superior in trapping efficiency of the fine powders. Such a production method can contribute to stabilization of water absorbing characteristics of a product obtained continuously, in a production scale (the upper limit is 10000 kg/h) of preferably equal to or higher than 500 kg/h, further preferably equal to or higher than 1000 kg/h, and particularly preferably equal to or higher than 1500 kg/h This production method can become more effective, when the fine powders collected with the trapping material is equal to or lower than 10% by mass of total production amount. This production method can become further effective, when the fine powders collected with the trapping material is equal to or lower than 5% by mass of total production amount. This production method is effective when the fine powders collected with the trapping material is equal to or lower than 3% by mass of total production amount, because quality of the resultant product can be maintained high.

As described above, in the present invention, because air containing humidity can be removed by reduced pressure state, dehumidification can be performed easily. By dehumidification, stable production is made possible, as well as aggregation or property decrease of the particulate water-absorbing agent can be suppressed. Further, by the reduced pressure state, the leakage from the apparatus or the pipeline or the like can be suppressed effectively. In addition, by these reduced pressure states, recovery of the fine powders in air can be made easy. In addition, by the reduced pressure state, the transporting step can be performed efficiently. By the reduced pressure state, an object of transportation can be transported pneumatically. That is, by pneumatic transportation using reduced pressure state, a product such as the polymer gel, the particulate water-absorbing resin, the particulate water-absorbing agent or the like can be transported. By pneumatic transportation using this reduced pressure state, efficient continuous production can be performed.

Each of the steps may be performed in batch by the same or different apparatus, but, preferably continuous production is performed by connecting each of the steps. Treatment time in each of the steps is determined as appropriate. Treatment time in each of the steps is, for example, as follows. Treatment time of the polymerization step is, for example, from 0.1 minute to 10 hours, and further from 1 minute to 1 hour. Treatment time of the drying step is, for example, from 0.1 minute to 10 hours, and further from 1 minute to 1 hour. Treatment time of the pulverization step is, for example, from 0.01 second to 1 hour, and further from 0.1 second to 0.5 hour. Treatment time of the classification step is, for example, from 0.01 second to 1 hour, and further from 0.1 second to 0.5 hour. Treatment time of the transporting step is, for example, from 0.01 second to 1 hour, and further from 0.1 second to 0.5 hour. Treatment time of the surface cross-linking step is, for example, from 0.1 minute to 5 hours, and further from 1 minute to 1 hour. Treatment time of the cooling step is, for example, from 1 minute to 2 hours, and further from 0.1 hour to 1 hour. Treatment time of the granule sizing step is, for example, from 1 minute to 2 hours, and further from 0.1 hour to 1 hour. Preferably two or more positions, further three or more positions, further four or more positions, and further five or more positions in all of the steps are set under reduced pressure state. In view of property enhancement of particulate water-absorbing agent, rate Rd occupied by time of reduced pressure state, in treatment time including and subsequent to the pulverization step, is preferably equal to or larger that 40%, more preferably equal to or larger that 50%, further preferably equal to or larger that 60%, far preferably equal to or larger that 70%, far preferably equal to or larger that 80%, and particularly preferably equal to or larger that 90%. The upper limit of Rd is not especially limited, and equal to or smaller than 100% is preferable. It should be noted that, time (total required time) required from the start point of the pulverization step to the end of the final step (the packaging step or the like), is T1. For example, when the packaging step is present, the T1 is time required from the pulverization step to the packaging step. When among the time T1, time, when a production object (the water-absorbing resin or the like) in the step is set under reduced pressure state, is T2, the ratio Rd (%) is calculated by the following expression.

$$Rd = [T2/T1] \times 100 \qquad \text{[Expression 2]}$$

It should be noted that, the T1 is not limited. Usually, the T1 is from 0.5 hour to 24 hours, and further from 1 hour to 20 hours.

Conventionally, it has been known in the field of the water-absorbing resin to perform reduced pressure polymerization or reduced pressure drying in order to prevent thermal deterioration. On the other hand, in the present invention, as described above, the steps including and subsequent to the pulverization step are set under reduced pressure state, with completely different object (enhancement of liquid permeation or the like).

In view of attaining enhancement of property such as liquid permeation, the preferable production method for the particulate water-absorbing agent relevant to the present invention includes essentially the polymerization step for obtaining the polymer gel, the drying step for drying the polymer gel to obtain a dried substance, the pulverization step for pulverizing the dried substance, the classification step for sieving the particulate water-absorbing resin, the surface cross-linking step for cross-linking the neighborhood of the surface of the particulate water-absorbing resin to obtain the particulate water-absorbing agent, the packaging step for filling a packaging material container with the particulate water-absorbing agent for packaging, the transporting step for transporting the products produced in each of the steps to other steps, and further includes 0 to 2 steps selected from a group consisting of the cooling step for cooling the particulate water-absorbing agent performed the surface cross-linking step, and the granule sizing step for sizing the particulate water-absorbing agent, and is the production method for the particulate water-absorbing agent, where time of equal to or more than 50% in treatment time from the pulverization step to the packaging step is set under reduced pressure state. Preferably, this production method includes 1 to 2 steps selected from a group consisting of the cooling step and the granule sizing step.

It should be noted that, in the present invention, pressure in the polymerization step and the drying step is not especially limited, but, in view of property of the particulate water-absorbing agent, it is preferable that these steps are set in normal pressure (atmospheric pressure).

It is preferable that the transporting step is set under reduced pressure state, but, the transporting step by pressurization is also preferable. That is, it is preferable that the transporting step is set under reduced pressure state or under pressurized state. As the transporting step by pressurization, pneumatic transportation is exemplified. That is, it is preferable that transportation by pressurization and transportation by reduced pressure are used in combination, and which of the transportation by pressurization and the transportation by reduced pressure is adopted is not especially limited, and an arbitrarily transportation method can be selected.

The pneumatic transportation has many merits as compared with mechanical transportation. As merits of the pneumatic transportation, less mechanical parts, less mechanical troubles, superiority in durability, one way, where a return line is not necessary different from a belt conveyer, less commingling of foreign materials and the like are included. By suction of air from a transportation destination by the reduced pressure apparatus, pneumatic transportation by reduced pressure can be attained. That is, by suction of air from the transportation destination by the reduced pressure apparatus, while the transporting step is set under reduced pressure state, pneumatic transportation from a transportation origin to the transportation destination can be attained. In this way, the transporting step relevant to the present invention may be set pneumatic transportation. The transporting step relevant to the present invention may be pneumatic transportation by reduced pressure. In addition, the transporting step by pressurization may be adopted. The transporting step relevant to the present invention may be pneumatic transportation by pressurization. As merits of the pneumatic transportation by pressurization, reducing of pipeline size, suppressing of dew condensation in the pipeline by using dry air in pressurization, and the like are included.

In the present invention, pressure in all steps other than the polymerization step, the drying step and the transporting step may be set under pressurized state. By setting a pressurized state, intrusion of grit and dust or the like into the apparatus, the pipeline or the like can be prevented, and commingling of foreign materials to the particulate water-absorbing resin or the particulate water-absorbing agent can be decreased, and therefore the particulate water-absorbing agent with high quality can be obtained. In addition, in the production method of the present invention, whether the steps other than the polymerization step, the drying step and the transporting step are set under reduced pressure state or set under pressurized state is not especially limited, and an arbitrary state may be selected.

It should be noted that, "A pressurized state" means a higher pressure state than atmospheric pressure. In addition, "degree of pressurization relative to atmospheric pressure" means pressure difference from atmospheric pressure, and when the pressure is higher than atmospheric pressure, it is expressed as a positive (plus) value. For example, when atmospheric pressure is standard atmospheric pressure (101.3 kPa), "the degree of pressurization of 10 kPa" means that pressure is 111.3 kPa. In the present application, "degree of pressurization relative to atmospheric pressure" may be called simply "degree of pressurization". It should be noted that, the degree of pressurization is preferably 0 to 1 MPa.

In view of suppressing moisture absorption or dew condensation inside the step, at least inside one step, preferable air temperature Ta inside the relevant step is set at equal to or higher than 25° C., more preferably equal to or higher than 30° C., and further preferably equal to or higher than 50° C. Because the too high temperature may provide the case where properties of the particulate water-absorbing agent decrease in an opposing way, this temperature Ta is preferably equal to or lower than 150° C. From the viewpoint of production stabilization, it is particularly preferable that this preferable temperature Ta is adopted in the pulverization step, the classification step and the granule sizing step. When moisture absorption or due condensation generates in these steps, stable production may be obstructed easily. In addition, because a storage part such as a hopper present in the production facility stores a large quantity of the particulate water-absorbing resin for a relatively long period, absorption of humidity tends to generate. In addition, when aggregation generates in the storage part such as a hopper, discharge of the particulate water-absorbing resin from a discharge port of the storage part becomes difficult, and therefore stable production tends to be obstructed. From this viewpoint, it is preferable that inner air in N units (N is an integer of equal to or more than 1) of the storage parts among the storage parts present in the production facility is set at the preferable temperature Ta. From the viewpoint of stable production, the N is preferably equal to or more than 1, more preferably equal to or more than 2, and more preferably equal to or more than 3. From the viewpoint of economic performance, the N is preferably equal to or less than 15, and more preferably equal to or less than 10. In addition, when aggregation generates in the pipeline, clogging of the pipeline tends to generate, and therefore stable production tends to be obstructed. It is preferable that a heating member is arranged at the outside of the hopper or pipeline or the like, in order to heat inner air of the storage part (hopper) or the pipeline. As this heating member, an electric heater such as a band heater, a pipe or a jacket or the like, which can pass through high temperature steam or heated liquid, may be adopted. In view of easy handling, the liquid is preferably water. From the viewpoint of heat conductivity, it is preferable that a material of the heating member (a pipe or the like) is preferably a metal, and more preferably copper or a copper-type alloy. It is preferable that this heating member is wound at the outer surface of the storage part such as the hopper.

EXAMPLES

Effect of the present invention will be clarified below with reference to Examples, but, the present invention should not be construed restrictively, based on description of these Examples. It should be noted that, in the present description, "parts by mass" and "% by mass" are synonymous to "parts by weight" and "% by weight", respectively.

(Measurement of CRC)

Absorbency against non-pressure (CRC) for a normal saline solution can be obtained as follows. Firstly, about 0.2 g of the particulate water-absorbing agent was weighed correctly (this weight becomes "mass of the particulate water-absorbing agent" of the following expression), which was put uniformly in a bag made of nonwoven fabric (60 mm×85 mm). This bag was immersed in a normal saline solution (about 200 g) with a temperature adjusted at 25±2° C. After 30 minutes, this bag was pulled up, and subjected to water draining for 3 minutes, by use of a centrifugal separation apparatus (a compact-type centrifugal separation apparatus, model-type: H-122, manufactured by Kokusan Co., Ltd.) under a condition of 250 G (250×9.81 m/s$^2$). Then, mass W4 (g) of the bag after performing the water draining was measured. In addition, similar operation was performed on the bag made of nonwoven fabric without containing the particulate water-absorbing agent, and mass W3 (g) of this bag was measured. Then absorbency against non-pressure was calculated according to the following expression, by using these masses W4 and W3.

$$CRC(g/g)=[(W4-W3)/\text{mass of the particulate water-absorbing agent}]-1 \quad \text{[Expression 3]}$$

(Measurement of AAP)

Absorbency against pressure for a normal saline solution under pressurization of 4.8 kPa (AAP4.8 kPa) can be obtained as follows. Firstly, a supporting cylinder made of plastic, having an inner diameter of 60 mm, having a metal mesh (a sieve mesh size of 38 μm) made of stainless steel welded at the bottom thereof, was prepared. Then, 0.900 g of the water-absorbing agent was spread uniformly on this metal mesh, and a piston (cover plate), having an outer diameter of a little smaller than 60 mm, having no clearance between the wall surface of the supporting cylinder and itself, and being able to slide up and down, was mounted on the metal mesh. Next, mass W6 (g) of the supporting cylinder, the particulate water-absorbing agent and the piston was measured. Then, by mounting a weight on this piston, it was adjusted so that a pressure of 4.8 kPa was uniformly loaded to the water-absorbing agent. Such an adjusted state is a measurement apparatus of this absorbency against pressure. Next, inside a Petri dish with a diameter of 150 mm, a glass filter with a diameter of 90 mm, and a thickness of 5 mm was put, and a normal saline solution, whose temperature was adjusted to 25±2° C., was poured, so as to become the same level as the upper surface of the glass filter. On the upper surface of this glass filter, a sheet of a filter paper (No. 2, manufactured by Toyo Roshi Kaisha, Ltd.) with a diameter of 9 cm was put, so that whole surface was wet, and then excess saline solution was removed. Next, the measurement apparatus was put on the filter paper so that the normal saline solution was absorbed under pressure. When water surface of the saline solution became lower than the upper surface of the glass filter, the saline solution was replenished to maintain the water surface level constant. After one hour, the measurement apparatus was picked out to measure mass W5 (g) excluding the weight. This mass W5 (g) is the total mass of the supporting cylinder, the swollen water-absorbing agent and the piston. Then absorbency against pressure under pressurization of 4.8 kPa, AAP (4.8 kPa) (g/g), was calculated according to the following expression, by using these masses W5 and W6. It should be noted that, Ws in the expression represents mass (g) of the water-absorbing agent.

$$AAP(4.8\ kPa)(g/g)=(W6-W5)/Ws \quad \text{[Expression 4]}$$

Absorbent articles, which are made by using the particulate water-absorbing agent obtained by the production method of the present invention, can be obtained, for example, by forming the particulate water-absorbing agent and, as needed, a hydrophilic fiber in a sheet-like shape. When the hydrophilic fiber is not used, the absorbent articles can be obtained by fixing the particulate water-absorbing agent in paper or non-woven fabric. Content (core concentration) of the particulate water-absorbing agent in such absorbent articles is, for example, 10 to 100% by weight, preferably 30 to 100% by weight, and more preferably 50 to 100% by weight. In addition, it is desirable that the absorbent articles are adjusted to have a density in a range of 0.06 to 0.5 g/cc, and a basis mass is in a range of 0.01 to 0.2 g/cm². It should be noted that, as a fiber substrate 34 to be used, for example, hydrophilic fiber such as pulverized wood pulp, cotton linter or cross-linked cellulose fiber, rayon, cotton, wool, acetate fiber, vinylon fiber or the like may be exemplified, and the airlaid one is preferable.

Amount of the fine powders contained in the particulate water-absorbing agent obtained by the production method of the present invention is low. In such a particulate water-absorbing agent, obstruction of liquid permeation caused by the fine powders is suppressed. Such a particulate water-absorbing agent is superior in liquid permeation. Therefore, the production method of the present invention is desirable as a production method for the particulate water-absorbing agent for which, in particular, high liquid permeation (SFC) is required.

(Measurement of SFC)

In measurement of saline flow conductivity (SFC), 0.900 g of the water-absorbing agent is put uniformly in a container. This water-absorbing agent is pressurized at 2.07 kPa, while being immersed into artificial urine. After 60 minutes, height of the swollen water-absorbing agent (gel layer) is recorded. In a state that the water-absorbing agent is pressurized at 2.07 kPa, a 0.69% by weight normal saline solution is passed through the gel layer. Room temperature in this case is adjusted at 20° C. to 25° C. By use of a computer and a balance, fluid amount passing through the gel layer is recorded in an interval of 20 seconds to calculate flow velocity Fs (T) of the fluid passing. Flow velocity Fs (T) is calculated by dividing increased mass (g) by increased time (s). Time when hydrostatic pressure of the saline solution became constant and stable flow velocity is obtained, is adopted as Ts, and only data measured for 10 minutes from the Ts is used in flow velocity calculation. From flow velocity measured for 10 minutes from the Ts, value of Fs (T=0) is obtained. This value is initial flow velocity for passing through the gel layer. Fs (T) is plotted against time, and Fs (T=0) is calculated based on the result obtained by the least square method. Saline flow conductivity (SFC) is calculated according to the following expression.

$$SFC=(Fs(t=0)\cdot L0)/(\rho\cdot A\cdot \Delta P) \quad \text{[Expression 5]}$$

In this expression, L0 is height (cm) of the gel layer, ρ is density (g/cm³) of the saline solution, A is cross-sectional area A (cm²) of the gel layer and ΔP is hydrostatic pressure (dyne/cm²) loaded on the gel layer. The artificial urine is obtained by mixing 0.25 g of a dehydrate of calcium chloride, 2.0 g of potassium chloride, 0.50 g of a hepta-hydrate of magnesium chloride, 2.0 g of sodium sulfate, 0.85 g of ammonium dihydrogen phosphate, 0.15 g of diammonium hydrogen phosphate, and 994.25 g of pure water. Such an evaluation is performed in accordance with the SFC test described in U.S. Pat. No. 5,849,405.

Example 1

By using a production facility shown by FIG. 1, the particulate water-absorbing agent was produced continuously. This production facility has capacity of producing 1500 kg/hr of the particulate water-absorbing agent. The fine powders generated in this production facility are collected with the fine-powder capturing apparatus 6 via the pipelines S4 to S20 and the pipeline 8a. Further, the fine powders collected with the fine-powder capturing apparatus 6 are supplied to the granulation apparatus 4j via the pipeline 8b. It should be noted that, as the trapping material, a bag filter was used, which is a membrane filter composed of a membrane (material: polytetrafluoroethylene, pore diameter: 2.5 µm, a thickness: 0.02 mm, trapping efficiency: 99.9%) and a substrate (material: polyester, average pore diameter: 50 µm, thickness: 2.3 mm, trapping efficiency: 50%). The fine powders collected with the trapping material was equal to or less than 2% by mass, based on total production mass.

In addition, the fine powders separated by the classification step and the fine powders separated by the granule sizing step are also supplied to the granulation apparatus 4j via each pipeline 8. In the granulation apparatus 4j, the fine powders collected in the fine-powder capturing apparatus 6, the fine powders separated by the classification step and the fine powders separated by the granule sizing step are mixed and granulated. It should be noted that, in the granulation step, warm water was used as the aqueous liquid in 110 parts by weight, relative to 100 parts by weight of the fine powders, and temperature of the fine powders was set at 60° C. and temperature of aqueous liquid was set at 70° C. to mix continuously in high speed for 0.3 second by use of a mixing apparatus, Turbulizer™. Granulated particles (average particle diameter: 0.5 to 3 mm, water content: 55% by mass) are supplied to a transportation pipeline between the polymerization step and the drying step via the pipeline 8.

Because the pressure reducing apparatus (a suction apparatus) is provided in the fine-powder capturing apparatus 6, the apparatuses and the pipelines connected to the fine-powder capturing apparatus 6 via a pipeline, are set under reduced pressure state. However, because pneumatic transportation is performed in the transportation pipeline from the granule sizing step to the packaging step, it is set under pressurized state. It should be noted that, degree of reduced pressure and degree of pressurization of the steps are as follows.

Table 1

The pulverization step (S4): Reduced pressure, 0.28 to 0.31 kPa; 2 to 3 minutes

The first pulverization apparatus 4c1: Reduced pressure, 0.28 to 0.30 kPa

The second pulverization apparatus 4c2: Reduced pressure, 0.30 to 0.31 kPa

The classification step (S6) 4d: Reduced pressure, 0.08 to 0.10 kPa; 1 to 2 minutes The surface cross-linking step: Reduced pressure, 0.10 to 0.65 kPa; 1 hour The mixing apparatus (S8) 4e: Reduced pressure, 0.46 to 0.48 kPa The transporting step between the mixing apparatus and the Heating apparatus (S9): Reduced pressure, 0.50 to 0.65 kPa Heating apparatus (S10) 4f: Reduced pressure, 0.10 to 0.12 kPa The cooling step (S12) 4g: Reduced pressure, 0.05 to 0.08 kPa; 1 hour The granule sizing step (S14): Reduced pressure, 0.11 to 0.69 kPa; 25 to 30 minutes Hopper 4h1: Reduced pressure, 0.21 kPa
Pulverizing machine 4h2: Reduced pressure, 0.18 kPa
Classification apparatus 4h3: Reduced pressure, 0.11 kPa
Hopper 4h4: Reduced pressure, 0.69 kPa
Conveyer 14: Reduced pressure, 0.21 kPa The transporting step between the granule sizing step and the packaging step (S15): Pressurization, 0.2 to 0.5 MPa; 1 to 15 minutes The packaging step (S16) 4i: Reduced pressure, 0.20 kPa; 5 to 7 minutes The transporting step other than the above: Reduced pressure, 0.50 to 0.65 kPa; 0.1 second to 1 minute Into an aqueous solution containing a partial sodium salt of acrylic acid with 75% by mole neutralized (hereafter referred to as "a monomer"), 0.06% by mole (relative to total mole number of the monomer) of polyethylene glycol diacrylate (average number of n=9) was added, and monomer concentration was made to be 38% by weight. It should be noted that, the "average number of n" means average number of polymerization degree of ethylene oxide in the polyethylene glycol chain.

By blowing nitrogen gas into the resultant aqueous solution of the monomer, concentration of dissolved oxygen was adjusted to 0.5 ppm by weight. Next, 0.14 g (relative to 1 mole of the monomer) of sodium persulfate and 0.005 g (relative to 1 mole of the monomer) of L-ascorbic acid were mixed by line mixing.

A mixture obtained by this line mixing was supplied to a flat surface steal belt having weirs at both ends, so as to attain a thickness of 25 mm, to perform static aqueous solution polymerization continuously for 30 minutes at 95° C. and then the polymer gel in a water-containing state was obtained (the polymerization step).

This polymer gel was segmentalized to about 1 mm by use of a meat chopper with a pore diameter of 7 mm. This segmentalized polymer gel was mounted on the porous plate of a band dryer, to attain a thickness of 50 mm, and subjected to hot air drying at 180° C. for 30 minutes, to obtain the particulate water-absorbing resin (the drying step).

The resultant particulate water-absorbing resin was supplied to a three-stage roll mill (roll gap configuration: from the top, 1.0 mm/0.55 mm/0.42 mm) to be pulverized (the pulverization step). Then, this pulverized substance was classified by using a classification apparatus having a metal meshes with a sieve mesh size of 850 μm and 150 μm to obtain the particulate water-absorbing resin, where particles with a particle diameter of 150 μm to 850 μm were 98% by weight (the classification step). It should be noted that, absorbency against non-pressure (CRC) of this particulate water-absorbing resin was 35 (g/g).

Next, a surface cross-linking agent solution adjusted to contain 0.30 part by weight of 1,4-butanediol, 0.50 part by weight propylene glycol and 2.70 part by weight pure water, relative to 100 parts by weight of the particulate water-absorbing resin, and the particulate water-absorbing resin were supplied to a high speed continuous mixing machine (Turbulizer™/1000 rpm) and mixed. Then the mixture was heated for 40 minutes with a paddle dryer (a groove-type stirring-type drier) adjusted at 200° C. (the surface cross-linking step).

After this, it was cooled to 60° C. by using the paddle dryer (a groove-type stirring-type dryer) (the cooling step), and classified by using the metal meshes with a sieve mesh size of 850 μm and 150 μm to obtain the particulate water-absorbing agent 1 as a product having a particle diameter of 150 μm to 850 μm (the granule sizing step). Further, this particulate water-absorbing agent was packed in the packaging material container (the packaging step) to be shipped as a product.

In the present Example 1, required time T1 of from the start point of the pulverization step to the end of the packaging step was 3 hours. In addition, time T2 where a production object in the steps was set under reduced pressure state was 2.8 hours (Rd value=about 93%).

Comparative Example 1

The particulate water-absorbing agent was produced by performing a similar operation as in Example 1, except that the pipelines S4 to S20 and the pipeline 8a were not connected. Therefore, only the transporting step between the granule sizing step and the packaging step, where pneumatic transportation is performed, was set under pressurized state, and other steps were set under normal pressure condition.

Example 2

By using the production facility shown in FIG. 1, the particulate water-absorbing agent was produced continuously. This production facility has capacity of producing the particulate water-absorbing agent in 1500 kg/hr. The pipelines S4, S5 and S14 are connected to the fine-powder capturing apparatus 6 via the pipeline 8a to collect the fine powders which generate in the pulverization step, the transporting step between the pulverization step and the classification step, and the granule sizing step. Further, the fine powders collected in the fine-powder capturing apparatus 6 are supplied to the granulation apparatus 4j via the pipeline 8b. It should be noted that, as the trapping material, a bag filter, which is a membrane filter composed of a membrane (material: polytetrafluoroethylene, pore diameter: 2.5 μm, a thickness: 0.02 mm, trapping efficiency: 99.9%) and a substrate (material: polyester, average pore diameter: 50 μm, thickness: 2.3 mm, trapping efficiency: 50%), was used.

In addition, the fine powders separated by the classification step and the fine powders separated by the granule sizing step are also supplied to the granulation apparatus 4j via each pipeline 8. In the granulation apparatus 4j, the fine powders collected in the fine-powder capturing apparatus 6, the fine powders separated by the classification step and the fine powders separated by the granule sizing step are mixed and granulated. It should be noted that in the granulation step, warm water was used as the aqueous liquid in 110 parts by weight, relative to 100 parts by weight of the fine powders, where temperature of the fine powders was set 60° C. and temperature of aqueous liquid was set 70° C. to mix continuously in high speed for 0.3 second using a mixing apparatus, Turbulizer™. Granulated particles (average particle diameter: 0.5 to 3 mm, water content: 55% by mass) are supplied to a transportation pipeline between the polymerization step and the drying step via the pipeline 8.

Because the pressure reducing apparatus (a suction apparatus) is provide in the fine-powder capturing apparatus 6, the apparatuses connected to the fine-powder capturing apparatus 6 via a pipeline, and the pipelines are set under reduced pressure state. It should be noted that, degree of reduced pressure and degree of pressurization of the steps are as follows.

Table 2

The pulverization step (S4): Reduced pressure, 0.28 to 0.31 kPa

The first pulverization apparatus 4c1: Reduced pressure, 0.28 to 0.30 kPa

The second pulverization apparatus 4c2: Reduced pressure, 0.30 to 0.31 kPa

The transporting step between the pulverization step and the classification step (S5): Reduced pressure, 0.50 to 0.65 kPa The granule sizing step (S14): Reduced pressure, 0.11 to 0.69 kPa Hopper 4h1: Reduced pressure, 0.21 kPa
Pulverizing machine 4h2: Reduced pressure, 0.18 kPa
Classification apparatus 4h3: Reduced pressure, 0.11 kPa
Hopper 4h4: Reduced pressure, 0.69 kPa
Conveyer 14: Reduced pressure, 0.21 kPa The transporting step between the granule sizing step and the packaging step (S15): Pressurization, 0.2 to 0.5 MPa The steps other than above: Normal pressure Into an aqueous solution containing a partial sodium salt of acrylic acid with 75% by mole neutralized (hereafter referred to as "a monomer"), 0.06% by mole (relative to total mole number of the monomer) of polyethylene glycol diacrylate (average number of n=9) was added to attain a concentration of the monomer of 38% by weight.

By blowing nitrogen gas into the resultant aqueous solution of the monomer, concentration of dissolved oxygen was adjusted to 0.5 ppm by weight. Next, 0.14 g (relative to 1 mole of the monomer) of sodium persulfate and 0.005 g (relative to 1 mole of the monomer) of L-ascorbic acid were mixed, by line mixing.

A mixture obtained by this line mixing was supplied to a flat surface steal belt having weirs at both ends, so as to attain a thickness of 25 mm, to perform static aqueous solution polymerization continuously for 30 minutes at 95° C. and then the polymer gel in a water-containing state was obtained (the polymerization step).

This polymer gel was segmentalized to about 1 mm by use of a meat chopper with a pore diameter of 7 mm. This segmentalized polymer gel was mounted on the porous plate of a band dryer, to attain a thickness of 50 mm, and subjected to hot air drying at 180° C. for 30 minutes, to obtain the particulate water-absorbing resin (the drying step).

The resultant particulate water-absorbing resin was supplied to a three-stage roll mill (roll gap configuration: from the top, 1.0 mm/0.55 mm/0.42 mm) to be pulverized (the pulverization step). After this, this pulverized substance was classified by using a classification apparatus having a metal meshes with a sieve mesh size of 850 μm and 150 μm to obtain the particulate water-absorbing resin, where particles with a particle diameter of 150 μm to 850 μm were 98% by weight (the classification step). It should be noted that, absorbency against non-pressure (CRC) of this particulate water-absorbing resin was 35 (g/g).

Next, a surface cross-linking agent solution adjusted to be composed of 0.30 part by weight of 1,4-butanediol, 0.50 part by weight of propylene glycol and 2.70 part by weight of pure water, relative to 100 parts by weight of the particulate water-absorbing resin, and the particulate water-absorbing resin were supplied to a high speed continuous mixing machine (Turbulizer/1000 rpm) and mixed. Then the mixture was heated for 40 minutes with a paddle dryer (a groove-type stirring-type drier) adjusted at 200° C. (the surface cross-linking step).

After this, it was cooled to 60° C. by using the paddle dryer (a groove-type stirring-type dryer) (the cooling step), and classified by using the metal meshes with a sieve mesh size of 850 μm and 150 μm to obtain the particulate water-absorbing agent as a product having a particle diameter of 150 μm to 850 μm (the granule sizing step). Further, this particulate water-absorbing agent was packed in the packaging material container (the packaging step) to be shipped as a product.

In the present Example 2, required time T1 of from the start point of the pulverization step to the end of the packaging step was 3 hours. In addition, time T2 where a production object in the steps was set under reduced pressure state was 1.5 hours (Rd value=50%).

Comparative Example 2

The particulate water-absorbing agent was produced by performing a similar operation as in Example 2, except that the pipelines S4, S5 and S14, and the pipeline 8a were not connected. Therefore, all steps were set under normal pressure state.

Example 3

By using the production facility shown in FIG. 1, FIG. 2 and FIG. 3, the particulate water-absorbing agent (150000 kg) was produced continuously. This production facility has capacity of producing the particulate water-absorbing agent in 1500 kg/hr. The first pipeline 8a, which is jointed to the fine-powder capturing apparatus, is connected to positions shown by S4 (the pulverization apparatus 4c), S5 (a transportation pipeline between the pulverization apparatus 4c and the classification apparatus 4d) and S14 (the granule sizing apparatus 4h), among the positions shown by the arrow lines S1 to S20 in FIG. 1, and these connected positions were set under reduced pressure state. The connected positions of the first pipeline 8a in S4 (the pulverization apparatus 4c) was set as four positions from S41 to S44 shown in FIG. 2. The connected positions of the first pipeline 8a in S5 (the transportation pipeline between the pulverization apparatus 4c and the classification apparatus 4d) was set as two positions, S51 and S52 shown in FIG. 2. The connected positions of the first pipeline 8a in S14 (the granule sizing apparatus 4h) was set as four positions, from S141 to S144 shown in FIG. 3. The positions where the first pipeline 8a was connected were set under reduced pressure state by the pressure reducing apparatus (a suction apparatus) included in the fine-powder capturing apparatus 6. Further, in this Example 3, a degree of reduced pressure of each position in FIG. 1 was set under follows. That is, the degree of reduced pressure inside the first pulverization apparatus 4c1 was set at 0.28 kPa to 0.30 kPa, the degree of reduced pressure of the second pulverization apparatus 4c2 was set at 0.30 kPa to 0.31 kPa, the degree of reduced pressure in the pipeline (the transporting step) between the second pulverization apparatus 4c2 and the classification apparatus 4d was set at 0.50 kPa to 0.65 kPa, the degree of reduced pressure inside the hopper 4h1 was set 0.21 kPa, the degree of reduced pressure inside the pulverizing machine 4h2 was set 0.18 kPa, the degree of reduced pressure inside the classification apparatus 4h3 was set 0.11 kPa, the degree of reduced pressure inside the hopper 4h4 was set 0.69 kPa, and the degree of reduced pressure inside space covering the conveyer 14 was set 0.21 kPa.

Table 3
The pulverization step (S4): Reduced pressure, 0.28 to 0.31 kPa
  The first pulverization apparatus 4c1: Reduced pressure, 0.28 to 0.30 kPa
  The second pulverization apparatus 4c2: Reduced pressure, 0.30 to 0.31 kPa
The transporting step between the pulverization step and the classification step (S5): Reduced pressure, 0.50 to 0.65 kPa
The granule sizing step (S14): Reduced pressure, 0.11 to 0.69 kPa
  Hopper 4h1: Reduced pressure, 0.21 kPa
  Pulverizing machine 4h2: Reduced pressure, 0.18 kPa
  Classification apparatus 4h3: Reduced pressure, 0.11 kPa
  Hopper 4h4: Reduced pressure, 0.69 kPa
  Conveyer 14: Reduced pressure, 0.21 kPa
The steps other than above: Normal pressure The second pipeline 8b, which is jointed to the fine-powder capturing apparatus, was jointed to the granulation apparatus 4j. This granulation apparatus was jointed to the pipeline 8 connecting the polymerization apparatus 4a and the drying apparatus 4b. The fine powders contained in gas suctioned accompanying with reduced pressure were collected with this fine-powder capturing apparatus 6 through the first pipeline 8a (the collection step). For this collection, as the trapping material, a bag filter was used. The fine powders thus collected were put in the granulation apparatus 4j through the second pipeline 8b. In this production method, the classification apparatus 4d and the granulation apparatus 4j are jointed by the pipeline 8, and the fine powders classified with this classification apparatus 4d were put in the granulation apparatus 4j via this pipeline and the hopper. In addition, the granule sizing apparatus 4h and the granulation apparatus 4j are jointed by the pipeline 8, and the fine powders classified with this granule sizing apparatus were charged into the granulation apparatus 4j via this pipeline and the hopper. In this granulation apparatus 4j, granulated particles obtained from the fine powders were charged in the drying step (the drying apparatus 4b).

In this Example 3, firstly an aqueous solution containing a partial sodium salt of acrylic acid with 75% by mole neutralized, as a monomer, and polyethylene glycol diacrylate (average number of n=9) of an internal cross-linking agent, was prepared as a monomer solution. In this monomer solution, monomer concentration was adjusted to 38% by mass. Concentration of the internal cross-linking agent was adjusted to 0.06% by mole, relative to the monomer.

Next, while this monomer solution was fed continuously with a metering pump, by blowing nitrogen gas continuously, oxygen concentration of this monomer solution was adjusted to equal to or lower than 0.5 ppm. Next, sodium persulfate and L-ascorbic acid were mixed to the monomer solution with line mixing, so that mass of sodium persulfate/L-ascorbic acid became 0.14 g/0.005 g, relative to 1 mole of the monomer. Next, the monomer solution was supplied to a flat surface steel belt having weirs at both sides thereof, so that thickness thereof became about 25 mm, to perform aqueous solution polymerization at 95° C. for 30 minutes and then polymer gel in a water-containing state was obtained (the polymerization step).

Next, this polymer gel was pulverized, and further this pulverized polymer gel was segmentalized to about 1 mm by use of a meat chopper with a pore diameter of 7 mm. This was spread thinly and mounted on the porous plate of a band dryer, to be subjected to hot air drying at 180° C. for 30 minutes, to obtain the particulate water-absorbing resin as a dried substance of the polymer gel (the drying step).

Next, this dried substance was pulverized to obtain a particulate dried substance. Whole mass of this particulate dried substance was continuously supplied to a three-stage roll mill (roll gap configuration: from the top, 1.0 mm/0.55 mm/0.42 mm) to be pulverized further (the pulverization step). The first pulverization apparatus 4c1 and the second pulverization apparatus 4c2 were used as this three-stage roll mill.

Next, it was classified by using a classification apparatus having a metal mesh with a sieve mesh size of 850 μm, and a metal mesh with a sieve mesh size of 150 μm (the classification step) to obtain the particulate water-absorbing resin. About 98% by mass of this particulate water-absorbing resin was the particulate water-absorbing resin with particle diameter thereof of 150 μm to 850 μm. It should be noted that, absorbency against non-pressure (CRC) of this particulate water-absorbing resin was 35 g/g.

Next, a surface cross-linking agent solution was prepared. This surface cross-linking agent solution was composed of 1,4-butanediol, propylene glycol and pure water, and 1,4-butanediol, propylene glycol and pure water were adjusted to be 0.30 part by mass, 0.50 part by mass and 2.70 part by mass, respectively, relative to 100 parts by mass of the particulate water-absorbing resin. Next, this particulate water-absorbing resin was continuously supplied in 1000 kg/hr to a high speed continuous mixing machine (Turbulizer/1000 rpm), and the surface cross-linking agent solution was sprayed with a sprayer to mix this surface cross-linking agent solution and the particulate water-absorbing resin. Next, the particulate water-absorbing resin mixed with this surface cross-linking agent solution was heated for 40 minutes with a paddle dryer adjusted at 200° C. (the surface cross-linking step).

After that, it was cooled to 60° C. (the cooling step).

After cooling (the cooling step), it was classified by using the metal mesh with a sieve mesh size of 850 μm, and the metal mesh with a sieve mesh size of 150 μm to obtain the particulate water-absorbing agent as a product having a particle diameter of 150 μm to 850 μm (the granule sizing step). A configuration of the granule sizing apparatus 4h, which performed the granule sizing step, is as shown in FIG. 3.

Then, this particulate water-absorbing agent was packed into a packaging material container (the packaging step).

In this Example 3, required time T1 from the start point of the pulverization step to the end of the packaging step was 3 hours, and among the time T1, time T2 where a production object in the steps was set under reduced pressure state was 2.8 hours (Rd value=about 93%).

Comparative Example 3

The particulate water-absorbing agent was produced similarly as in Example 3, except that the first pipeline 8a was not connected to any of the apparatuses and pipelines of FIG. 1. In this Comparative Example 1, a part which was set under reduced pressure state was not installed. In addition, in this Comparative Example 1, collection of the fine powders by reduced pressure was not performed (Rd value=0%). It should be noted that, in this Comparative Example 1, the fine powders having passed through the 150 μm metal mesh, obtained in the classification step and the granule sizing step were put in the granulation apparatus.

Example 4

The particulate water-absorbing agent was produced similarly as in Example 3, except that 1% by mass of a 50% aqueous solution of aluminum sulfate was added, relative to the water-absorbing resin, in the cooling step.

Comparative Example 4

The particulate water-absorbing agent was produced similarly as in Comparative Example 3, except that 1% by mass of a 50% aqueous solution of aluminum sulfate was added, relative to the water-absorbing resin, in the cooling step.

[Performance Evaluation of the Particulate Water-Absorbing Agent]

On the particulate water-absorbing agent, amount of dust (AD), content rate of the fine powders, absorbency against non-pressure (CRC), absorbency against pressure (AAP) and saline flow conductivity (SFC) were measured. Measurement methods for absorbency against non-pressure (CRC), absorbency against pressure (AAP) and saline flow conductivity (SFC) were as described above. Results thereof are shown in the following Table 1.

[Evaluation of Amount of Dust]

Amount of dust was measured using "Heubach DUSTMETER" (trade name), manufactured by Heubach Engineering GmbH (Germany). This amount of dust was obtained by measuring mass captured on a glass fiber filter paper by suction for a predetermined period. A measurement mode was set at Type I. This measurement was performed in atmosphere with a temperature of 25° C.±2° C., a relative humidity of 20 to 40% and under atmospheric pressure. In detail, firstly, the particulate water-absorbing agent produced (100.00 g) was put in a rotating drum. Next, mass Da of the glass fiber filter paper having a holding particle diameter (JIS P3801) of 0.5 μm, and a diameter of 50 nm (for example, a trade name "GLASS FIBER GC-90" manufactured by ADVANTEC Co. Ltd., or an equivalent product thereof) was measured in a unit of down to 0.00001 g. Next, a filter case mounted with the glass fiber filter paper was attached to the rotating drum. Next, the dust meter was operated for 30 minutes under condition of a drum rotation number of 30 rpm, and a suction air volume of 20 L/min. Next, mass Db of the glass fiber filter paper, after passing a predetermined period, was measured in a unit of down to 0.00001 g. By using these masses Da and Db, amount of dust, AD, was calculated according to the following expression. The result thereof is shown in the following Table 1.

$$AD(ppm)=(Db-Da)/100.00\times 1000000 \quad \text{[Expression 6]}$$

[Evaluation of Content of Fine Powders]

The particulate water-absorbing agent (100.00 g) was classified with a metal mesh with a sieve mesh size thereof of 150 μm to measure mass ratio of the fine powders (below 150 μm) contained in this particulate water-absorbing agent. The result thereof is shown in the following Table 1.

[Performance Evaluation of the Particulate Water-Absorbing Agent]

On the particulate water-absorbing agent, absorbency against non-pressure (CRC), absorbency against pressure (AAP) and saline flow conductivity (SFC) were measured. Measurement methods for absorbency against non-pressure (CRC), absorbency against pressure (AAP) and saline flow conductivity (SFC) were as described above. Results thereof are shown in the following Table.

As shown in Table, Examples have low generation amount of dust, and the low fine powders contained in the particulate water-absorbing agent obtained as a product, as well as superior absorbency against non-pressure (CRC), absorbency against pressure (AAP) and saline flow conductivity (SFC). From these evaluation results, superiority of the present invention is obvious.

INDUSTRIAL APPLICABILITY

The production method of the particulate water-absorbing agent composed principally of the water-absorbing resin relevant to the present invention can be applied suitably for producing absorbent articles such as hygiene materials and the like containing absorbing bodies, for example, disposable diapers or sanitary napkins, incontinent pads and the like.

The invention claimed is:

1. A method for producing a particulate water-absorbing agent comprising:
   a polymerization step for obtaining a polymer gel;
   a drying step for drying the polymer gel to obtain a dried substance;
   a pulverization step for pulverizing the dried substance under a reduced pressure to obtain a particulate water-absorbing resin, wherein the reduced pressure is lower than atmospheric pressure by no more than 10 kPa;
   a classification step for sieving the particulate water-absorbing resin; and
   a transporting step for transporting the products produced in each of the steps to other steps.

2. The method for producing the particulate water-absorbing agent according to claim 1, wherein equal to or more than 50% of the time required from the pulverization step to the packaging step is set under a reduced pressure state.

3. The method for producing the particulate water-absorbing agent according to claim 1, wherein 50% or more of the total time required for the steps including and subsequent to the pulverization step is set under a reduced pressure state.

4. The method for producing the particulate water-absorbing agent according to claim 1, wherein the transporting step performed next to the pulverization step is set under a reduced pressure state.

5. The method for producing the particulate water-absorbing agent according to claim 1, wherein all steps including and subsequent to the pulverization step are set under a reduced pressure state.

6. The method for producing the particulate water-absorbing agent according to claim 1, wherein the transporting step comprises the transporting step by pressurization.

7. The method for producing the particulate water-absorbing agent according to claim 6, wherein all steps other than the pulverization step are set under a reduced pressure state or a pressurized state.

8. The method for producing the particulate water-absorbing agent according to claim 1, further comprising a granulation step.

TABLE 4

| | Example 1 | Com. Exp. 1 | Example 2 | Com. Exp. 2 | Example 3 | Com. Exp. 3 | Example 4 | Com. Exp. 4 |
|---|---|---|---|---|---|---|---|---|
| Amount of dust AD [ppm] | 30 | 500 | 50 | 700 | 30 | 500 | 50 | 700 |
| Content of fine powders [% by mass] | 0.3 | 2.8 | 0.3 | 2.3 | 0.3 | 2.8 | 0.3 | 2.3 |
| CRC [g/g] | 30.5 | 30.5 | 30.5 | 30.5 | 30.5 | 30.5 | 30.5 | 30.5 |
| AAP [g/g] | 25.1 | 24.5 | 24.3 | 23.5 | 25.1 | 24.5 | 24.3 | 23.5 |
| SFC [$\times 10^{-7}$ cm$^3 \cdot$ s $\cdot$ g$^{-1}$] | 32 | 22 | 53 | 40 | 32 | 22 | 53 | 40 |

9. The method for producing the particulate water-absorbing agent according to claim 1, wherein the particulate water-absorbing resin is an irregular pulverized shaped particle of a polyacrylic acid (salt)-based water-absorbing resin.

10. The method for producing the particulate water-absorbing agent according to claim 1, wherein the polymerization step is performed by continuous kneader polymerization or continuous belt polymerization.

11. The method for producing the particulate water-absorbing agent according to claim 1, wherein the surface cross-linking step is performed using a surface cross-linking agent, having dehydration esterification reactivity of one or more kinds selected from a group consisting of an oxazolidinone compound, an alkylene carbonate compound, a polyvalent alcohol compound, and an oxetane compound, at a temperature in the range of 150 to 250° C.

12. The method for producing the particulate water-absorbing agent according to claim 1, wherein absorbency against non-pressure (CRC) of the particulate water-absorbing agent is equal to or higher than 15 g/g, and saline flow conductivity (SFC) thereof is equal to or higher than 30 ($\times 10^{-7} \cdot cm^3 \cdot s \cdot g^{-1}$).

13. The method for producing the particulate water-absorbing agent according to claim 1, wherein the content of fine powders with a weight average particle diameter of below 150 μm, contained in the particulate water-absorbing agent, is below 1% by weight relative to the total weight of the particulate water-absorbing agent.

14. The method for producing the particulate water-absorbing agent according to claim 1, wherein one or more of the classification step, and the transporting step after the pulverization step are performed under a reduced pressure.

15. A method for producing a particulate water-absorbing agent comprising:
   a polymerization step for obtaining a polymer gel;
   a drying step for drying the polymer gel to obtain a dried substance;
   a pulverization step for pulverizing the dried substance under a reduced pressure to obtain a particulate water-absorbing resin, wherein the reduced pressure is lower than atmospheric pressure by no more than 10 kPa;
   a classification step for sieving the particulate water-absorbing resin;
   a granule sizing step for granule sizing a particulate water-absorbing agent obtained from the particulate water-absorbing resin obtained in the classification step; and
   a transporting step for transporting the products produced in each of the steps to other steps.

16. The method for producing the particulate water-absorbing agent according to claim 15, wherein one or more of the classification step, the granule sizing step, and the transporting step after the pulverization step are performed under a reduced pressure.

17. A method for producing a particulate water-absorbing agent comprising:
   a polymerization step for obtaining a polymer gel;
   a drying step for drying the polymer gel to obtain a dried substance;
   a pulverization step for pulverizing the dried substance under a reduced pressure to obtain a particulate water-absorbing resin, wherein the reduced pressure is lower than atmospheric pressure by no more than 10 kPa;
   a classification step for sieving the particulate water-absorbing resin;
   a surface cross-linking step for cross-linking the neighborhood of the surface of the particulate water-absorbing resin obtained in the classification step to obtain a particulate water-absorbing agent;
   a packaging step for filling a packaging material container with the particulate water-absorbing agent for packaging; and
   a transporting step for transporting the products produced in each of the steps to other steps.

18. The method for producing the particulate water-absorbing agent according to claim 17, wherein one or more of the classification step, the surface cross-linking step, the packaging step, and the transporting step after the pulverization step are performed under a reduced pressure.

19. A method for producing a particulate water-absorbing agent comprising:
   a polymerization step for obtaining a polymer gel;
   a drying step for drying the polymer gel to obtain a dried substance;
   a pulverization step for pulverizing the dried substance under a reduced pressure to obtain a particulate water-absorbing resin, wherein the reduced pressure is lower than atmospheric pressure by no more than 10 kPa;
   a classification step for sieving the particulate water-absorbing resin;
   a surface cross-linking step for cross-linking the neighborhood of the surface of a particulate water-absorbing resin obtained in the classification step to obtain a particulate water-absorbing agent;
   a granule sizing step for granule sizing the particulate water-absorbing agent;
   a packaging step for filling a packaging material container with the particulate water-absorbing agent, obtained in the granule sizing step for packaging; and
   a transporting step for transporting the products produced in each of the steps to other steps.

20. The method for producing the particulate water-absorbing agent according to claim 19, wherein equal to or more than 50% of the time required from the pulverization step to the packaging step is set under a reduced pressure state.

21. The method for producing the particulate water-absorbing agent according to claim 19, wherein one or more of the classification step, the surface cross-linking step, the granule sizing step, the packaging step, and the transporting step after the pulverization step are performed under a reduced pressure.

* * * * *